US012530996B2

(12) United States Patent
Kawachi et al.

(10) Patent No.: US 12,530,996 B2
(45) Date of Patent: Jan. 20, 2026

(54) DISPLAY DEVICE

(71) Applicant: Tianma Japan, Ltd., Kanagawa (JP)

(72) Inventors: Genshiro Kawachi, Kanagawa (JP); Masamichi Shimoda, Kanagawa (JP)

(73) Assignee: TIANMA JAPAN, LTD., Kawasaki (JP)

( * ) Notice: Subject to any disclaimer, the term of this patent is extended or adjusted under 35 U.S.C. 154(b) by 0 days.

(21) Appl. No.: 18/813,460

(22) Filed: Aug. 23, 2024

(65) Prior Publication Data

US 2025/0078705 A1 Mar. 6, 2025

(30) Foreign Application Priority Data

Aug. 28, 2023 (JP) ................................. 2023-138456

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0814* (2013.01); *G09G 2300/0819* (2013.01); *G09G 2300/0842* (2013.01); *G09G 2300/0861* (2013.01); *G09G 2310/08* (2013.01); *G09G 2320/045* (2013.01); *G09G 2330/12* (2013.01)

(58) Field of Classification Search
CPC ................. G09G 3/006; G09G 3/3233; G09G 2300/0814; G09G 2300/0819; G09G 2300/0842; G09G 2300/0861; G09G 2310/08; G09G 2320/045; G09G 2330/12
See application file for complete search history.

(56) References Cited

U.S. PATENT DOCUMENTS

2004/0070558 A1* 4/2004 Cok ..................... G09G 3/3225 345/76
2011/0164011 A1 7/2011 Yamamoto et al.
2016/0155380 A1* 6/2016 Kwon .................. G09G 3/3233 345/78
2019/0279566 A1 9/2019 Wang et al.
2022/0114960 A1* 4/2022 Yin ........................ H10K 59/12
2023/0105534 A1* 4/2023 Shimoda .............. G09G 3/3233 345/690

* cited by examiner

*Primary Examiner* — David Tung
(74) *Attorney, Agent, or Firm* — NIXON & VANDERHYE

(57) ABSTRACT

Each of pixel circuits includes a light-emitting element, a first power line to supply the light-emitting element with a power-supply voltage, a driving transistor to control current to the light-emitting element, a sensing transistor whose gate electrode is connected to an end of the light-emitting element, a second power line connected to a drain electrode of the sensing transistor, and a first switching transistor connected between a source electrode of the sensing transistor and a sense line. The driving transistor controls sense current from the first power line to the light-emitting element in order to measure a voltage at an end of the light-emitting element. The sensing transistor supplies a source voltage to the sense line when the light-emitting element is being supplied with the sense current. A measurement circuit determines a voltage of the light-emitting element based on an output of the sense line.

10 Claims, 17 Drawing Sheets

$$G = \frac{Vrst - Vth(M8) + Ron(M9) \times Is}{Vrst}$$

DISPLAY DEVICE

CROSS-REFERENCE TO RELATED APPLICATIONS

This non-provisional application claims priority under 35 U.S.C. § 119(a) on Patent Application No. 2023-138456 filed in Japan on Aug. 28, 2023, the entire content of which is hereby incorporated by reference.

BACKGROUND

This disclosure relates to a display device, particularly to measurement of deterioration in light intensity of a light-emitting element.

An organic light-emitting diode (OLED) element is a current-driven light-emitting element and therefore, does not need a backlight. In addition to this, the OLED element has advantages for achievement of low power consumption, wide viewing angle, and high contrast ratio; it is expected to contribute to development of flat panel display devices.

A light-emitting element such as an OLED element suffers from irreversible variation in its characteristics that affects its light emission life. Specifically, the variation causes a problem such as an image burn-in or a residual image, where a trace of a fixed image is persistently seen. An example of a method to solve or mitigate the problem compensates for the deterioration in light intensity of OLED elements. This method estimates the degree of deterioration of each OLED element and controls its light emission by adjusting the light intensity depending on the degree of deterioration. As a result, differences in light intensity among pixels caused by the deterioration of OLED elements can be reduced.

SUMMARY

An aspect of this disclosure is a display device includes a plurality of pixel circuits on a substrate, a sense line on the substrate, and a measurement circuit. Each of the plurality of pixel circuits includes a light-emitting element, a first power line configured to supply the light-emitting element with a power-supply voltage that makes electric current flow through the light-emitting element, a driving transistor configured to control an amount of lighting current to the light-emitting element, a sensing transistor whose gate electrode is connected to an end of the light-emitting element, a second power line connected to a drain electrode of the sensing transistor, and a first switching transistor connected between a source electrode of the sensing transistor and the sense line. Note that an end of a circuit component may be represented by terminal symbol or connection symbol. The sensing transistor, the first switching transistor, the sense line, and the second power line are included in a sensing circuit. The driving transistor is configured to control sense current from the first power line to the light-emitting element in order to measure a voltage at an end of the light-emitting element. The sensing transistor is configured to supply a source voltage to the sense line when the light-emitting element is being supplied with the sense current. The measurement circuit is configured to determine a voltage of the light-emitting element based on an output of the sense line.

It is to be understood that both the foregoing general description and the following detailed description are exemplary and explanatory and are not restrictive of this disclosure.

EMBODIMENTS

Figure 1:
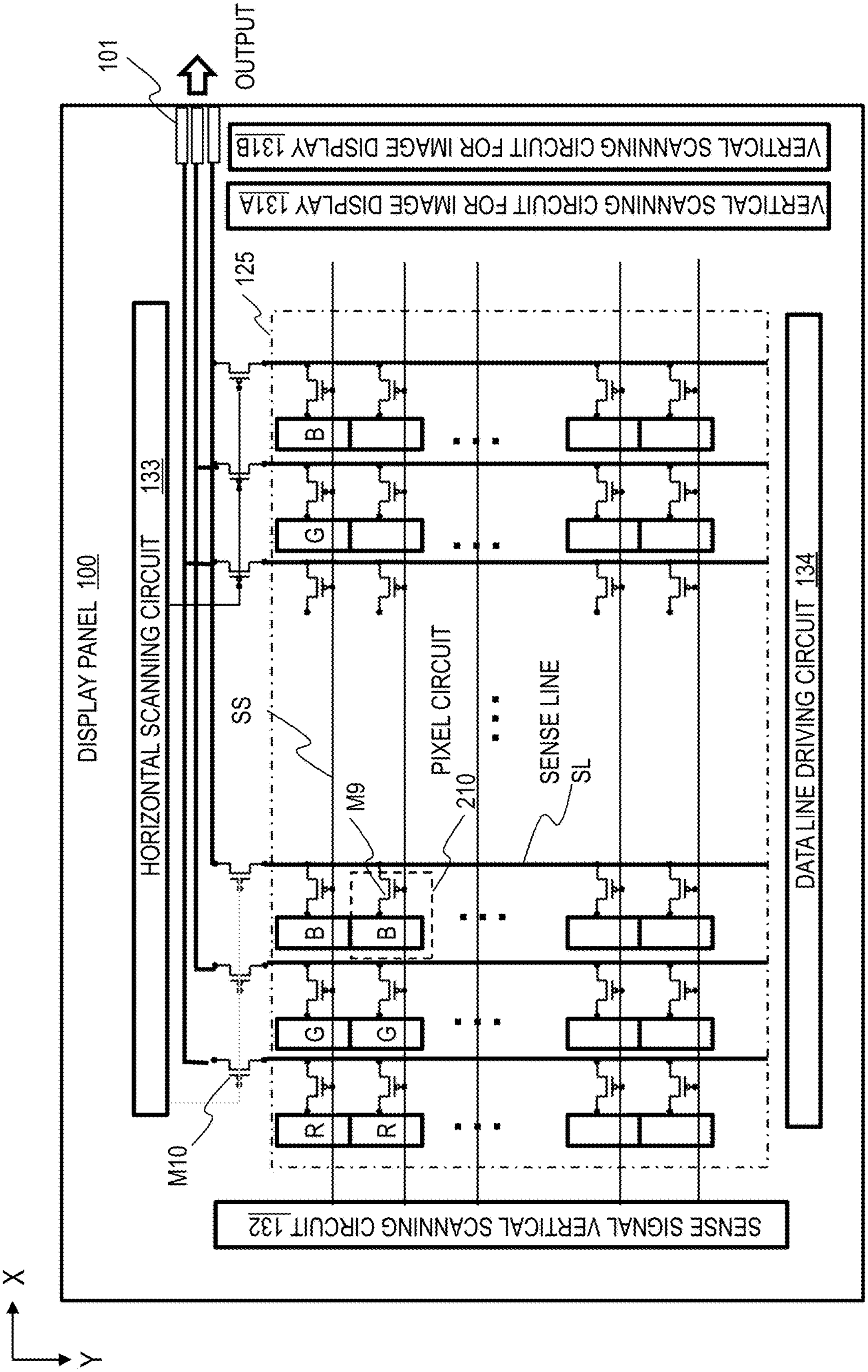
FIG. 1 schematically illustrates a configuration example of a display panel included in an OLED display device.

Hereinafter, embodiments of this disclosure will be described with reference to the accompanying drawings. It should be noted that the embodiments are merely examples to implement this disclosure and not to limit the technical scope of this disclosure.

A display device in an embodiment of this specification measures the degree of deterioration in light intensity of each light-emitting element. The degree of deterioration in light intensity of a light-emitting element can be estimated from the variation in current-voltage characteristic of the light-emitting element. An example of the measurement supplies a constant current to the OLED element through a sense line and measures the voltage at the monitoring point in the pixel (in the examples described herein, the anode of the OLED element).

The measurement requires time to charge the line capacitor of a sense line and accordingly, if the supplied sense current is low, the measurement takes long time. Although this time can be reduced by increasing the sense current, the voltage drop across the selection switching transistor may be significantly large and interfere with proper measurement. Increasing the channel width of the selection switching transistor to mitigate this voltage drop is not practical from the standpoint of the pixel layout.

An embodiment of this disclosure generates sense current for measuring the voltage of the light-emitting element from a power line for supplying a power-supply voltage to be used in the pixel circuit and supplies the sense current to the light-emitting element. The circuit for reading the voltage of the light-emitting element includes a sensing circuit configured of a source follower circuit. The sensing circuit includes a sensing transistor whose gate is connected to the monitoring point. The source of the sensing transistor is connected to a sense line directly or via a switching transistor. The sense line is supplied with a constant current.

Since the sense current is generated within the pixel circuit, even if the sense current is low, the effect of the capacitance of the sense line onto the time constant is small, enabling speedy measurement. Since the monitoring voltage is supplied to the gate of the sensing transistor, electric current does not flow, preventing the voltage drop at the sensing transistor. Furthermore, an embodiment of this disclosure uses a correlated double sampling (CDS) circuit to measure the voltage of the light-emitting element. This circuit effectively reduces the variations in threshold voltage Vth among sensing transistors.

First Embodiment

Configuration of Display Panel

A display device in an embodiment of this specification is described. For clear understanding of the description, elements in the drawings may be exaggerated in size and/or shape. The following describes an OLED display device as an example of the display device. The measurement of a characteristic of a light-emitting element in this disclosure is applicable to current-driven light-emitting elements different from the OLED element, such as inorganic LED elements.

FIG. 1 schematically illustrates a configuration example of a display panel 100 included in an OLED display device. The display panel 100 includes a display region 125 composed of a plurality of pixel circuits 210 arrayed on an insulating substrate. In FIG. 1, one of the pixel circuits is provided with a reference sign 210 by way of example. Driving circuits for the pixel circuits 210, specifically, vertical scanning circuits for image display 131A and 131B, a sense signal vertical scanning circuit 132, a horizontal scanning circuit 133, and a data line driving circuit 134, are disposed in the periphery of the display region 125.

In the configuration example of FIG. 1, the sense signal vertical scanning circuit 132 is disposed on the left side of the display region 125; the vertical scanning circuits for image display 131A and 131B are disposed on the right side of the display region 125; the horizontal scanning circuit 133 is disposed on the upper side of the display region 125; and the data line driving circuit 134 is disposed on the lower side of the display region 125.

Each pixel circuit 210 includes an OLED element (light-emitting element) and a thin-film transistor (TFT) circuit for controlling light emission of the OLED element or measuring the deterioration of the OLED element. In the configuration example of FIG. 1, the display region 125 consists of M pixel circuit rows each composed of a plurality of pixel circuits 210 aligned along the X-axis. The pixel circuit rows are disposed one above another along the Y-axis. Each pixel circuit row is a pixel circuit line. In an example, the pixel circuits constituting a pixel circuit row are connected to one or more common selection lines (control lines) and controlled simultaneously.

The display region 125 also consists of N pixel circuit columns each composed of a plurality of pixel circuits 210 aligned along the Y-axis. The pixel circuit columns are disposed side by side along the X-axis. The layout of the pixel circuits 210 can be determined as appropriate depending on the design. A pixel row or a pixel column is a pixel line. In an example, the pixel circuits constituting a pixel circuit column are connected to the same data line and data signals are written from the data line to the pixel circuits selected one after another.

The OLED element in a pixel circuit 210 emits a specific color of light. For example, the colors of light emitted from all pixel circuits 210 can be the same white or different among red, green and blue as illustrated in FIG. 1. In the example of FIG. 1, each pixel circuit column includes OLED elements for the same color. The pixel circuits 210 included in the display region 125 display an image in accordance with video data from the external.

The vertical scanning circuits for image display 131A and 131B output a plurality of kinds of selection signals to each pixel circuit row in order to write data signals for displaying an image to the pixel circuits 210 therein and to light ON/OFF the OLED elements therein, for example. For simplicity of illustration, FIG. 1 does not include the scanning lines for transmitting the selection signals from the vertical scanning circuits for image display 131A and 131B to the pixel circuits 210 in each pixel circuit row. Each scanning line is connected to a terminal of the vertical scanning circuit for image display 131A or 131B and one or more pixel circuit rows.

The data line driving circuit 134 outputs data signals to the pixel circuit row selected to display an image (frame). The data signals specify emission intensities of the OLED elements in the pixel circuit row in accordance with the gray levels of the image to be displayed. For simplicity of illustration, FIG. 1 does not include data lines for transmitting the data signals from the data line driving circuit 134 to the pixel circuits 210 selected from individual pixel circuit columns. Each data line is connected to a terminal of the data line driving circuit 134 and a pixel circuit column.

The pixel circuits in a pixel circuit row are connected to a common sense-signal scanning line SS extending along the X-axis. In FIG. 1, one of the sense-signal scanning lines is provided with a reference sign SS by way of example. The sense-signal scanning lines SS are driven by the sense signal vertical scanning circuit 132. The sense signal vertical scanning circuit 132 outputs a selection signal for a pixel circuit row to measure the deterioration of the OLED elements in the pixel circuits 210 therein. Each pixel circuit 210 includes a selection switching transistor M9 that turns ON/OFF in accordance with the selection signal transmitted by the sense-signal scanning line SS.

The horizontal scanning circuit 133 outputs a selection signal for a pixel circuit column to measure the deterioration of the OLED elements in the pixel circuits 210 therein. The selection signal turns ON a selected selection switching transistor M10. The transistor M10 is connected to a sense line SL extending along the Y-axis and the sense line SL is connected to the transistors M9 (pixel circuits 210) in one pixel column. In FIG. 1, one of the transistors is provided with a reference sign M10 by way of example.

A sense line SL transmits a sense signal representing the degree of deterioration of a selected OLED element. The horizontal scanning circuit 133 selects a sense line SL or a pixel column to read a sense signal therefrom. In FIG. 1, one of the sense lines is provided with a reference sign SL by way of example.

In the configuration example of FIG. 1, each terminal of the horizontal scanning circuit 133 is connected to the transistors M10 of three pixel columns for different colors of red, blue, and green and these pixel columns are selected together. The transistors M10 of the pixel columns for the same color are connected to the same transmission line extending to an output terminal 101. There are three output terminals 101 for outputting signals of red pixel circuits, blue pixel circuits, and green pixel circuits. In FIG. 1, one of the output terminals is provided with a reference sign 101 by way of example. A transistor M10 electrically connects a sense line SL and an output terminal 101, so that a sense line SL to output a signal is selected. A sense signal representing the deterioration of an OLED element read from the sense line SL is transmitted from the output terminal 101 to an external control circuit. The circuits including the external control circuit and the driving circuits of the display panel can be referred to as control driving circuits.

Measurement of Deterioration of OLED Element

Figure 2:
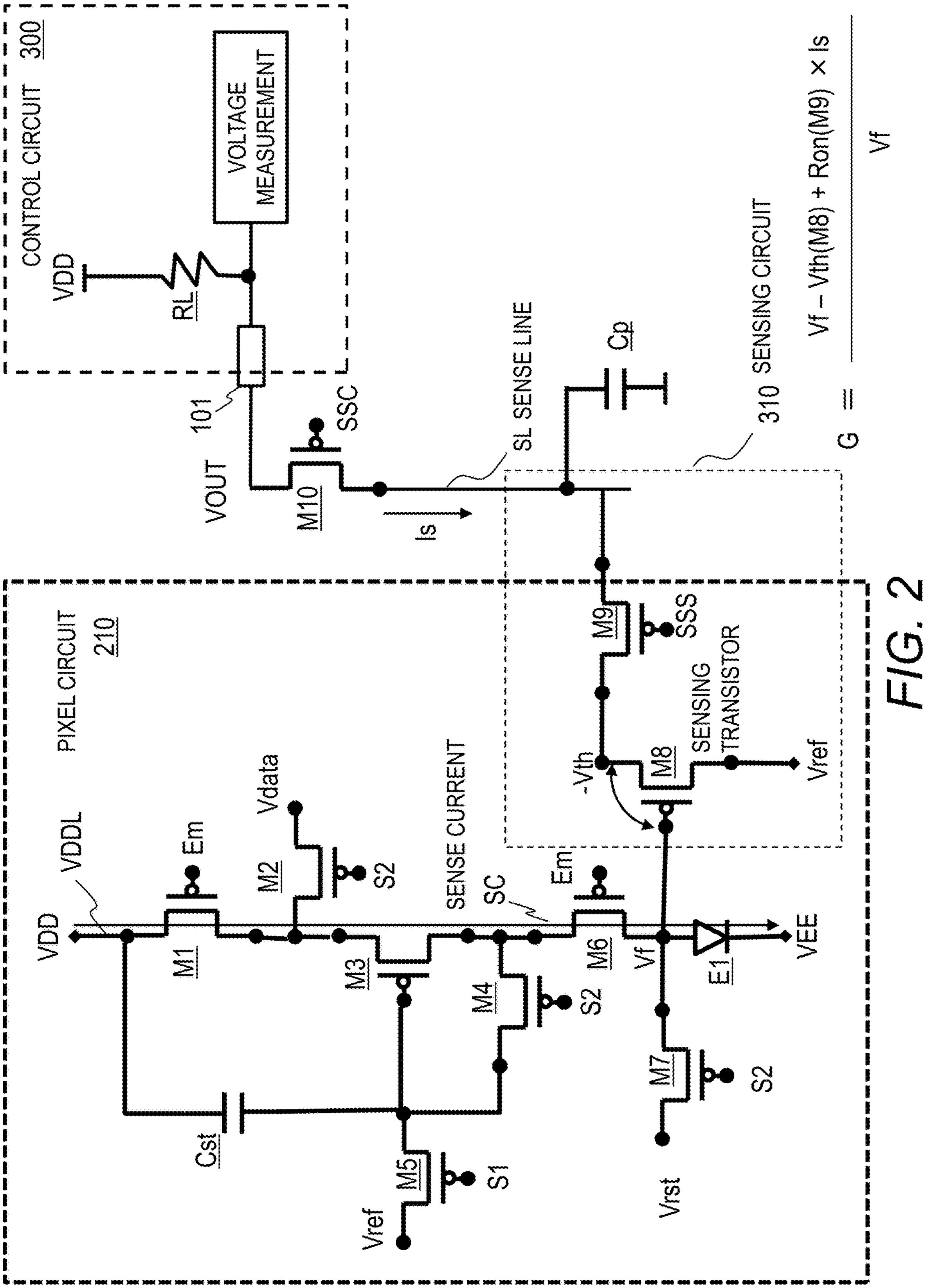
FIG. 2 schematically illustrates a configuration example of a pixel circuit and a circuit for measuring the deterioration of an OLED element in the pixel circuit.

A pixel circuit 210 includes an OLED element and controls the light intensity of the OLED element by controlling the electric current to be supplied to the anode of the OLED element. FIG. 2 schematically illustrates a configuration example of a pixel circuit 210 and a circuit for measuring the deterioration of the OLED element in the pixel circuit.

The pixel circuit 210 includes an OLED element E1, nine thin-film transistors (TFTs) M1 to M9, and a storage capacitor Cst. The pixel circuit 210 works to control light emission of the OLED element E1 and further, to measure the deterioration of the OLED element E1 in the pixel circuit 210. The deterioration measurement measures the current-voltage characteristic of the OLED element E1. In this example, the transistors M1 to M9 are of the p-type and the transistors except for the transistor M3 are switching transistors.

The transistor M3 is a driving transistor for controlling the amount of electric current to the OLED element E1. The driving transistor M3 controls the amount of electric current to be supplied from a power line VDDL for supplying an anode power-supply voltage VDD to the OLED element E1 in accordance with the voltage held by the storage capacitor Cst. The cathode of the OLED element E1 is connected to a power line for supplying a cathode power-supply voltage VEE. The storage capacitor Cst holds the gate-source voltage (also simply referred to as gate voltage) of the driving transistor M3.

The transistors M1 and M6 control whether to light the OLED element E1. The transistor M1 switches ON/OFF the supply of electric current from the anode power line VDDL to the driving transistor M3. The transistor M6 switches ON/OFF the supply of electric current from the driving transistor M3 to the OLED element E1. The transistors M1 and M6 are controlled by an emission control signal Em input from the vertical scanning circuit for image display 131A or 131B.

The transistor M5 controls whether to supply a reference voltage to the gate of the driving transistor M3. When the transistor M5 is turned ON by a selection signal S1 from the vertical scanning circuit for image display 131A or 131B, it supplies a reference voltage Vref from a reference power line to the gate of the driving transistor M3. The reference voltage Vref is a constant voltage that is lower than the power-supply voltage VDD and can be equal to or higher than the power-supply voltage VEE.

The transistor M2 is a selection transistor for selecting the pixel circuit 210 to be supplied with a data signal. The gate voltage of the transistor M2 is controlled by a selection signal S2 supplied from the vertical scanning circuit for image display 131A or 131B. When the selection transistor M2 is ON, it supplies a data signal Vdata from a data line to the gate of the driving transistor M3 (the storage capacitor Cst).

The selection transistor M2 (the source and the drain thereof) in this example is connected between the data line and the source of the driving transistor M3. The transistor M4 (the source and the drain thereof) is connected between the drain and the gate of the driving transistor M3. The transistor M4 works to compensate for the variation of the threshold voltage of the driving transistor M3. The data signal Vdata from the data line is supplied to the storage capacitor Cst via the selection transistor M2, the driving transistor M3, and the transistor M4 in an ON state. The storage capacitor Cst stores a voltage where the threshold voltage Vth of the driving transistor M3 is added to the data signal.

The transistor M7 controls whether to supply a reset voltage Vrst to the anode of the OLED element E1. When the transistor M7 is turned ON by the selection signal S2 from the vertical scanning circuit for image display 131A or 131B, it supplies the reset voltage Vrst from the reset power line to the anode of the OLED element E1. The reset voltage Vrst is a constant voltage that is lower than the power-supply voltage VDD and can be equal to or higher than the power-supply voltage VEE.

The transistor M8 is a sensing transistor for measuring the anode voltage of the OLED element E1 in order to measure the deterioration of the OLED element E1. The gate of the transistor M8 is connected to a sense node located between the anode of the OLED element E1 and the transistor M6 and supplied with the anode voltage of the OLED element E1. In measuring the deterioration of the OLED element E1, the anode voltage is denoted by Vf.

As illustrated in FIG. 2, the sense current SC for measuring the deterioration of the OLED element E1 is supplied from the power line VDDL via the transistors M1, M3 and M6. The amount of the sense current SC is predetermined and constant. The path of the sense current SC is the same as the path of the current to the OLED element E1 in regular image display. In this configuration, the parasitic capacitances associate to the path of the sense current is very small because the current path is limited within single pixel, thereby enabling fast deterioration measurement.

The drain of the transistor M8 is supplied with the reference voltage Vref and its source is connected to the drain of the transistor M9. The source of the transistor M9 is connected to the sense line SL. The gate of the transistor M9 is connected to a sense-signal scanning line SS and controlled by a selection signal SSS from the sense signal vertical scanning circuit 132. The supply line of the reference voltage Vref, the transistor M8, and the transistor M9 are provided specifically for the pixel to constitute a sensing circuit 310. The voltage source connected to the drain of M8 could be a separate voltage source than Vref. However, utilizing Vref is preferable for simplifying the pixel layout design.

The sense line SL has a sense line capacitance (parasitic capacitance) Cp. The drain of a transistor M10 is connected to the sense line SL and its source is connected to an output terminal 101. The gate of the transistor M10 is controlled by a selection signal SSC from the horizontal scanning circuit 133. The transistors M9 and M10 are switches for selecting the pixel circuit 210 to measure the characteristic of the OLED element E1 therein.

A control circuit 300 can be provided outside the display panel 100. The control circuit 300 generates a data signal from video data received from the external to display an image corresponding to the video data and controls the driving circuits 131A, 131B, and 134. The control circuit 300 also controls the sense signal vertical scanning circuit 132 and further, acquires a signal representing the characteristic of the OLED element E1 through the sense line SL to evaluate the OLED element E1. The control circuit 300 determines the data signal to be supplied to the pixel circuit 210 depending on the condition of the OLED element E1.

The control circuit 300 measures the deterioration of the OLED element E1. The measurement is executed in a mode different from the regular mode for displaying images. The deterioration measurement can be executed in response to an instruction from the user or automatically before the activated display device starts displaying images.

The control circuit 300 measures the voltage VOUT transmitted by the sense line SL and output from the output terminal 101. The measurement writes a data signal for deterioration measurement to the storage capacitor Cst and subsequently, turns ON the transistors M1, M6, M8, M9, and M10 and turns OFF the transistors M2, M4, M5, and M7.

A predetermined sense current SC flows from the power line VDDL into the OLED element E1; the anode voltage of the OLED element E1 is denoted by Vf. This embodiment measures the anode voltage Vf of the OLED element E1 with the sensing circuit 310. This configuration achieves speedy measurement with small delay even if the sense current is low.

The drain of the transistor M8 is supplied with the reference voltage Vref that is lower than the power-supply voltage VDD. The control circuit 300 supplies the sense line SL with a constant current Is substantially determined by a resistance RL, the power-supply voltage VDD, and the reference voltage Vref. The anode of the OLED element E1 is connected to the gate of the transistor M8. The source of the transistor M8 is connected to the drain of the transistor M9. The source voltage of the transistor M8 is (Vf−Vth), where the Vth represents the threshold voltage of the transistor M8. The sense voltage VOUT is at a value obtained by adding the voltage drop expressed as the product of the on-resistance Ron of the transistor M9 and the constant current Is (Ron×Is) to the source voltage of the transistor M8 (Vf−Vth+Ron×Is). The circuit configuration of the constant current supply for the sense line is determined desirably and is not to be limited to this example.

Since the transistors M8 and M9 are provided specifically for the pixel circuit, the sense voltage VOUT is affected by the threshold voltage Vth of the transistor M8 and the on-resistance Ron of the transistor M9 to cause variations among pixel circuits. However, the column selection switching transistor M10 can have a wide channel width because it is disposed in the periphery of the display region 125. Therefore, the voltage drop caused by the on-resistance of M10 is sufficiently small and the variations among columns are small enough to be ignored.

The input/output gain G of the sensing circuit 310 is defined by the ratio of the output voltage (sense voltage) VOUT to the input voltage VIN (anode voltage Vf) of the sensing circuit 310:

$$G=(VIN-Vth+Ron\times Is)/VIN.$$

In the case where the transistors are of p-type like those in the embodiment in FIG. 2, the input/output gain G takes a value smaller than 1 because VIN takes a negative value, Vth takes a negative value, and Ron×Is takes a positive value. In the case where the transistors are of n-type, the input/output gain G also takes a value smaller than 1 because VIN takes a positive value, Vth takes a positive value, and Ron×Is takes a negative value.

To reduce the variations among pixel circuits 210, the control circuit 300 can have information on the sense voltage VOUT of each pixel circuit 210 (OLED element E1) measured at the initial state in a memory and calculate the difference from the sense voltage acquired in the deterioration measurement. Then, the effect of the threshold voltage Vth and the on-resistance Ron onto the deterioration measurement can be reduced. If the threshold voltage does not substantially affect the deterioration measurement or the variations among pixel circuits can be ignored, the measurement result does not need calibration.

Alternatively, the control circuit 300 can eliminate the effect of the variations by storing information on the input/output gain G of each sensing circuit 310 in the memory and calibrating the sense voltage VOUT measured from each pixel.

Second Embodiment

Another embodiment of measurement of deterioration of an OLED element is described. The following mainly describes differences from the first embodiment. This embodiment uses not only a source follower circuit but also a correlated double sampling (CDS) circuit to calibrates the sense voltage VOUT in measuring the deterioration of an OLED element. As described above, the sense voltage VOUT is affected by the threshold voltage of the sensing transistor and the on-resistance Ron of the transistor M9. The CDS circuit calibrates the signal with an analog voltage in acquiring the signal. Accordingly, the control circuit 300 does not need to store the initial values in advance and further, the aging variation of the threshold value Vth and the on-resistance Ron of the transistor M9 can be canceled in real time.

Figure 3:
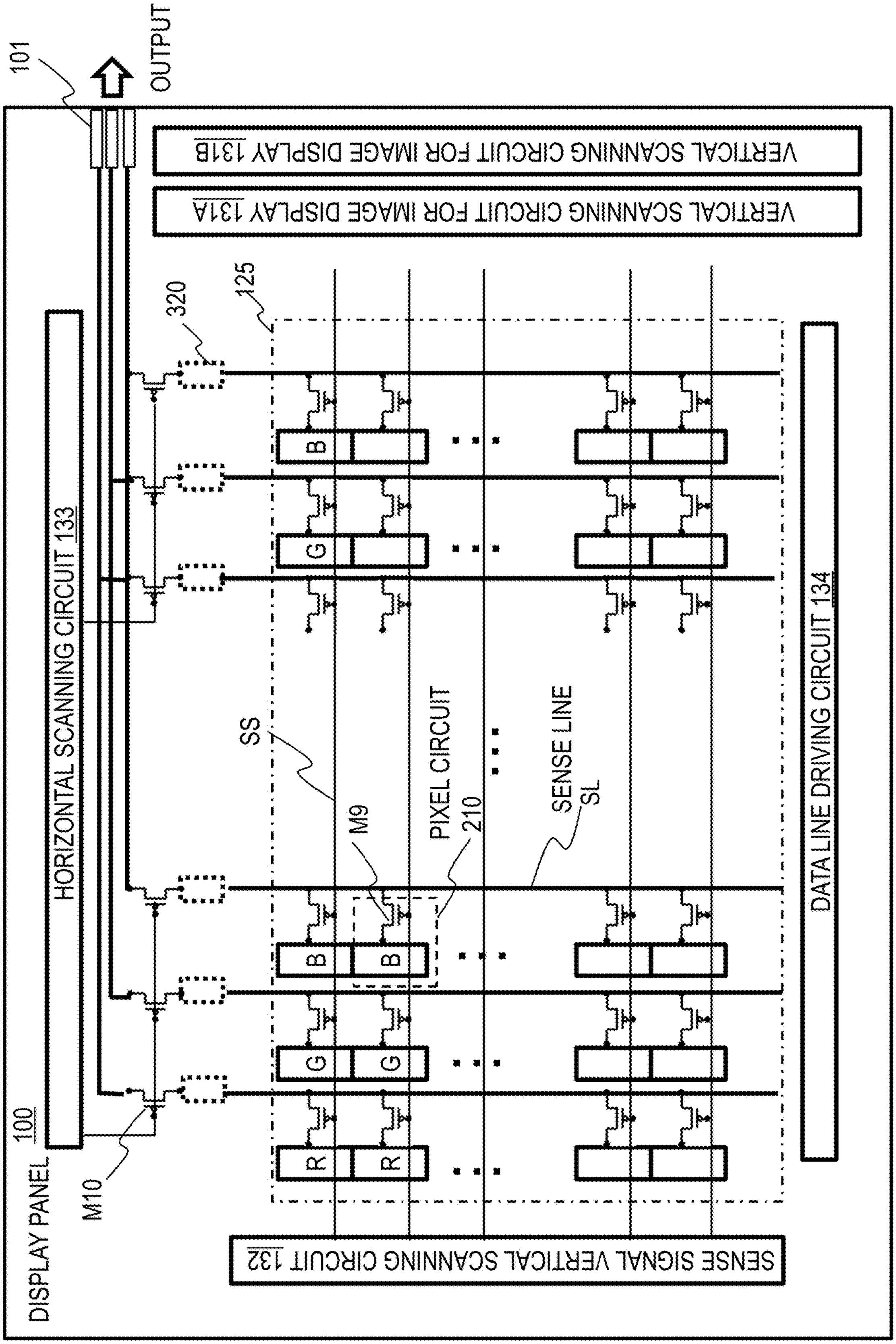
FIG. 3 schematically illustrates another configuration example of a display panel included in an OLED display device.

FIG. 3 schematically illustrates another configuration example of a display panel 100 included in an OLED display device. Compared to the configuration of a display panel in FIG. 1, CDS circuits 320 are added. Each CDS circuit 320 is provided for a different sense line. In other words, each CDS circuit 320 is provided between a sense line SL and a transistor M10. The display panel 100 including CDS circuits 320 can perform more accurate measurement and does not need a CDS circuit in the control circuit 300. One CDS circuit may perform the sense voltage calibration for a plurality of sense lines.

Figure 4:
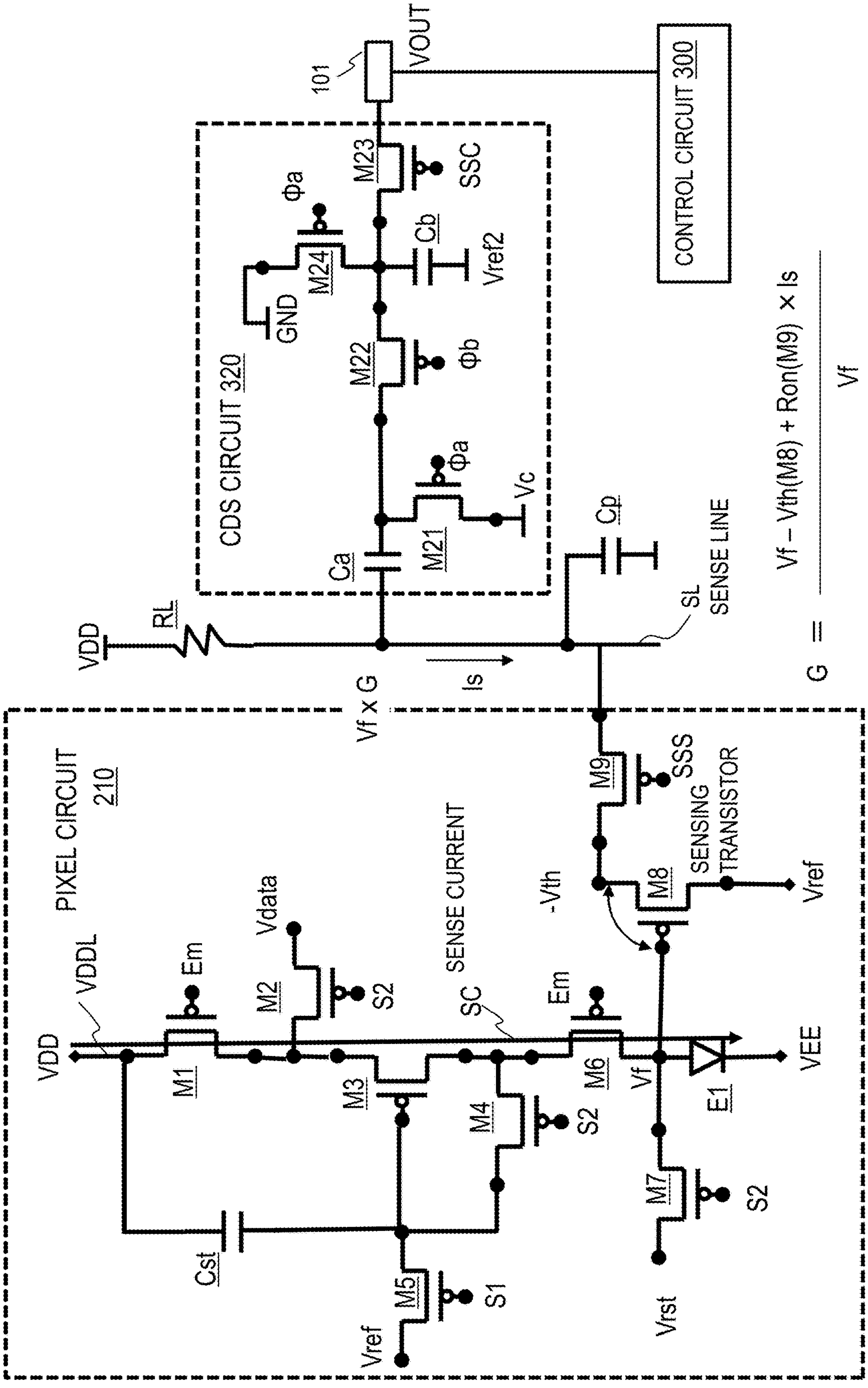
FIG. 4 illustrates a configuration example of a circuit including a CDS circuit to measure the deterioration of an OLED element.

FIG. 4 illustrates a configuration example of a circuit including a CDS circuit 320 to measure the deterioration of an OLED element E1. Compared to the configuration example of a circuit in FIG. 2, a CDS circuit 320 is added and the resistor RL for determining the constant current to be supplied to the sense line SL is disposed on the insulating substrate of the display panel 100. Some of the components on the display panel 100, such as the VDD line in the source follower circuit, the resistor RL, and the transmission lines for signals Φa and Φb, are omitted in FIG. 3.

In the example described with reference to FIG. 3, the CDS circuits 320 are provided on the insulating substrate of the display panel 100. When a CDS circuit 320 processes a signal including a variation (noise), it samples an unknown signal and a reference signal and takes the difference therebetween to remove the noise correlated to the unknown signal. For the CDS circuit 320 to remove the variations of the threshold voltage Vth of the sensing transistor M8 and the on-resistance Ron of the transistor M9, a reference signal including those variations has to be prepared.

The reference signal must be a known signal and this embodiment uses the reset voltage Vrst supplied to the anode of the OLED element E1. This configuration efficiently enables the CDS circuit 320 to be supplied with a reference signal without preparing additional lines and power supply for the reference signal.

As illustrated in FIG. 4, the CDS circuit 320 includes capacitors Ca and Cb and switching transistors M21 to M24. The transistors M21 to M24 in this example are p-type thin-film transistors. The capacitor Ca, the transistor M22, and the transistor M23 are connected in series in this order from the sense line SL toward the output terminal 101. An end of the capacitor Ca is connected to the sense line SL and the other end is connected to one source/drain of the transistor M22.

The other source/drain of the transistor M22 is connected to one source/drain of the transistor M23. The other source/drain of the transistor M23 is connected to the output terminal 101. The gate of the transistor M22 is supplied with a selection signal Φb from the control circuit 300 or the horizontal scanning circuit 133. The gate of the transistor M23 is supplied with a selection signal SSC from the horizontal scanning circuit 133.

One source/drain of the transistor M21 is connected to a node between the capacitor Ca and the transistor M22 and the other source/drain is supplied with a constant voltage Vc, which is a voltage between VDD and VEE. One source/drain of the transistor M24 is connected to a node between the transistors M22 and M23 and the other source/drain is supplied with a ground voltage GND. The ground voltage GND is a constant voltage that is lower than the power supply voltage VDD and can be equal to or higher than the power supply voltage VEE. The gates of the transistors M21 and M24 are supplied with a selection signal Φa from the control circuit 300 or the horizontal scanning circuit 133. One end of the capacitor Cb is connected to the node between the transistors M22 and M23 and the other end is supplied with a reference voltage Vref2. The reference voltage Vref2 is a constant voltage that is lower than the power supply voltage VDD and can be equal to or higher than the power supply voltage VEE.

In deterioration measurement for the OLED element E1, the CDS circuit 320 is supplied with a signal obtained by multiplying the anode voltage Vf of the OLED element E1 by the input/output gain G of the sensing circuit 310 and outputs a signal VOUT in which the variations included in the input/output gain G or the variations of the threshold voltage Vth of the transistor M8 and the on-resistance of the transistor M9 are canceled.

An example of operation in deterioration measurement using the CDS circuit 320 is described in the following. The CDS circuit 320 samples (reads) a reference signal (Vrst×G) when the reset voltage (reference voltage) Vrst is being supplied to the anode of the OLED element E1 and a measurement target signal (unknown signal) (Vf×G) when the sense current SC is being supplied to the anode of the OLED element E1 and outputs a signal VOUT representing the difference between these signals.

Figure 5:
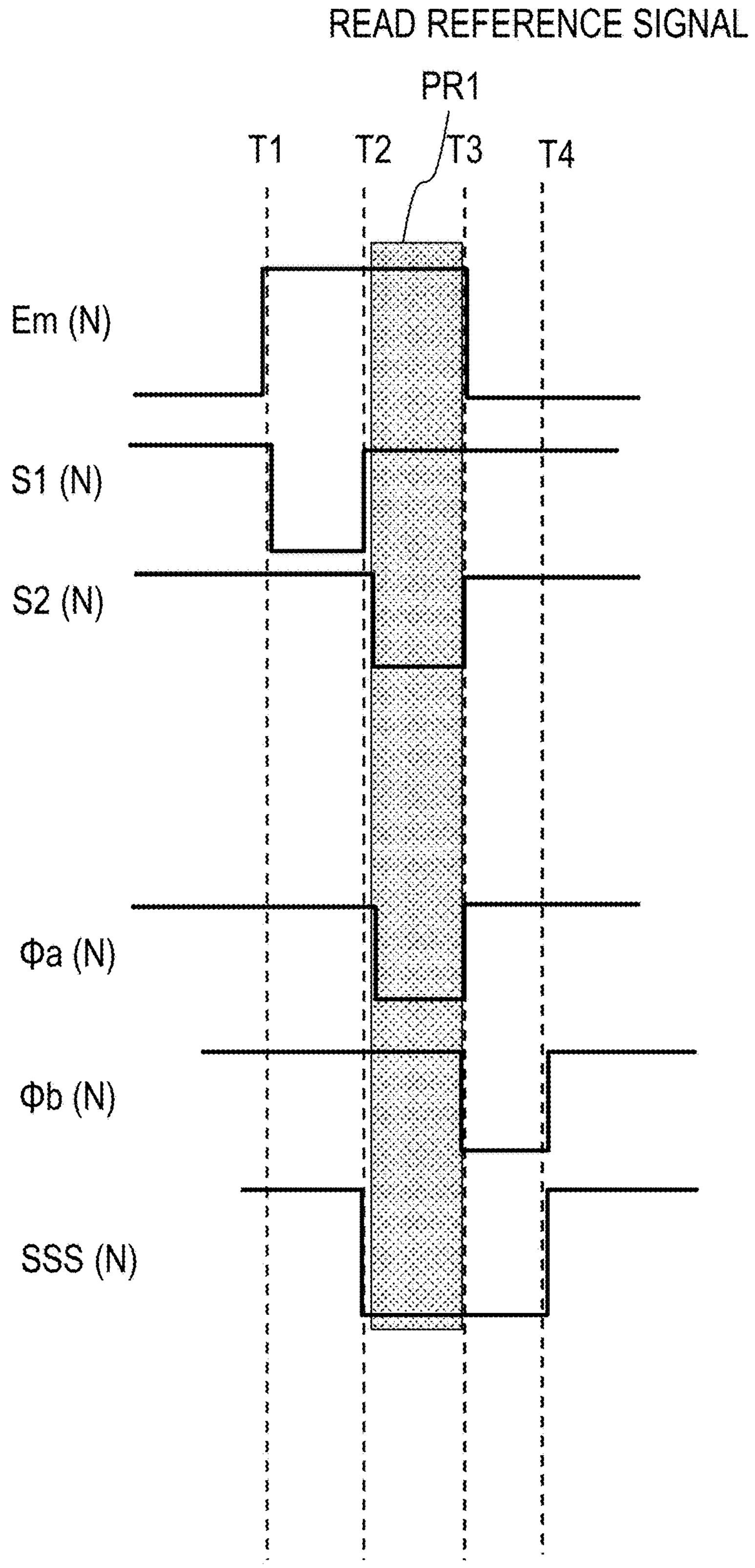
FIG. 5 is a timing chart illustrating temporal variation of some control signals in reading a reference signal.

FIG. 5 is a timing chart illustrating temporal variation of some control signals in reading the reference signal. Specifically, FIG. 5 illustrates temporal variation of the signals Em(N), S1(N), S2(N), Φa(N), Φb(N), and SSS(N), where N indicates a signal for the N-th pixel circuit row.

At a time T1, the signal Em(N) changes from an L-level to an H-level; the signal S1(N) changes from an H-level to an L-level; the signal S2(N) keeps an H-level; the signal Φa(N) keeps an H-level; the signal Φb(N) keeps an H-level; and the signal SSS(N) keeps an H-level.

Since the signal Em(N) changes to an H-level, the transistors M1 and M6 turn OFF. Since the signal S1(N) changes to an L-level, the transistor M5 turns ON. Since the signal S2(N) keeps an H-level, the transistors M2, M4, and M7 are kept OFF. This means that the sense current does not flow within the pixel circuit and the reference voltage Vref is supplied to the gate of the transistor M3. Since the signals Φa(N), Φb(N), and SSS(N) keep an H-level, the transistors M9, M21, M22, and M24 are OFF. The transistor M23 is also OFF.

At a time T2 later than the time T1 by 1H, the signal Em(N) keeps the H level; the signal S1(N) changes from the L-level to an H-level; the signal S2(N) changes from the H-level to an L-level; the signal Φa(N) changes from the H-level to an L-level; the signal Φb(N) keeps the H-level; and the signal SSS(N) changes from the H-level to an L-level.

Since the signal Em(N) keeps the H-level, the transistors M1 and M6 are OFF. Since the signal S1(N) changes to an H-level, the transistor M5 turns OFF. Since the signal S2(N) changes to an L-level, the transistors M2, M4, and M7 turn ON. This means that the sense current does not flow within the pixel circuit and a data signal for supplying sense current SC is written to the storage capacitor Cst. The anode of the OLED element E1 is supplied with the reset voltage Vrst.

Since the signals Φa(N) and SSS(N) change to an L-level, the transistors M21, M24, and M9 turn ON. Since the signal Φb(N) keeps the H-level, the transistor M22 is OFF. One end of the capacitor Ca is supplied with a voltage (Vrst×G) and the other end is supplied with a voltage Vc. The ends of the capacitor Cb are supplied with the ground voltage and the reference voltage Vref2. The transistor M23 is OFF.

The levels of the signals are maintained from the time T2 to a time T3. During this period PR1 for 1H, the CDS circuit 320 reads the reference signal (Vrst×G). That is to say, during the period PR1, the signals Em(N), S1(N), and Φb(N) are at an H-level and the signals S2(N), Φa(N), and SSS(N) are at an L-level.

Figure 6:
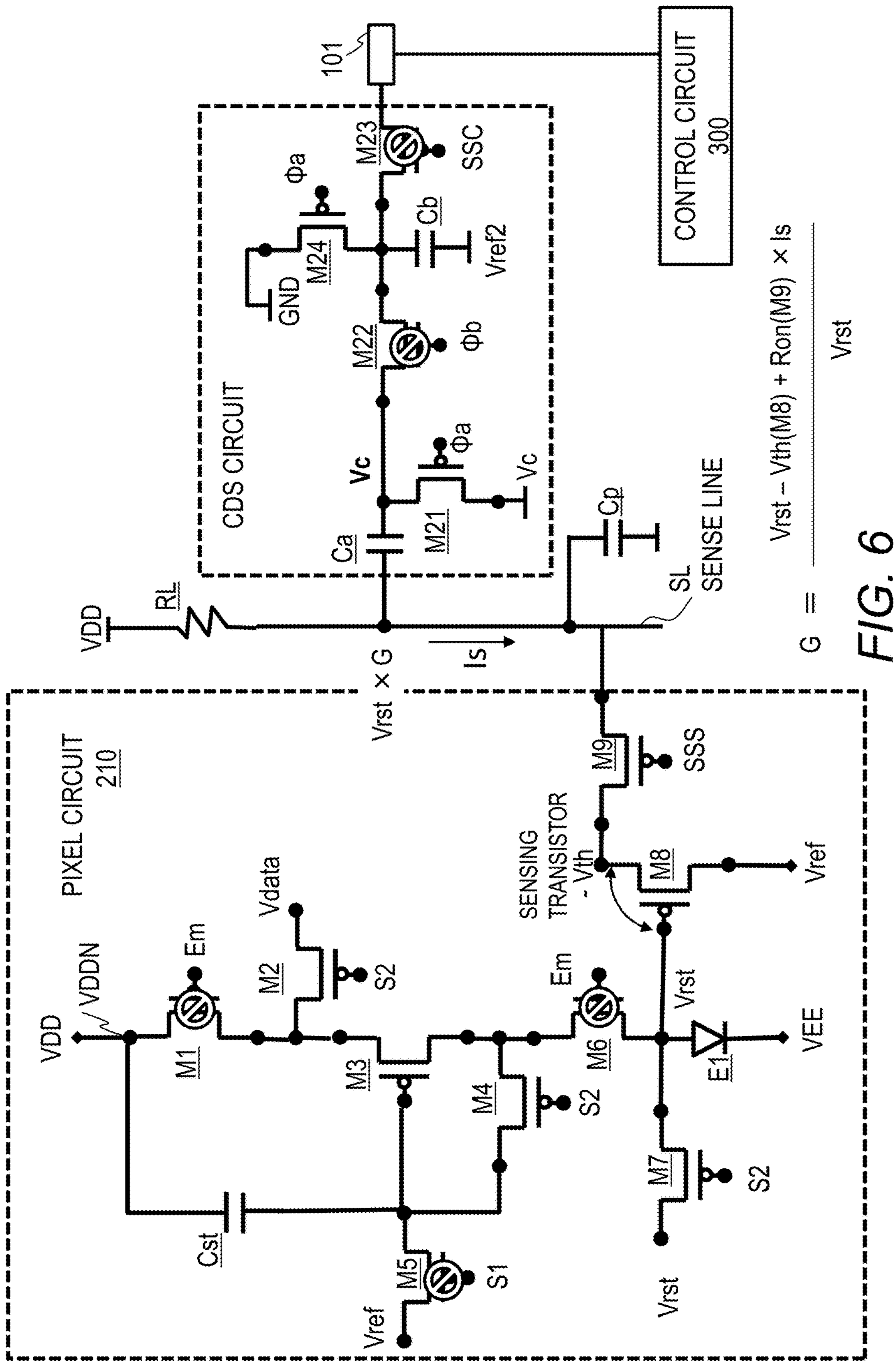
FIG. 6 illustrates the ON/OFF states of the transistors in a pixel circuit and a CDS circuit during a period PR1.

FIG. 6 illustrates the ON/OFF states of the transistors in a pixel circuit 210 and a CDS circuit 320 during the period PR1. Since the signals Em(N), S1(N), and Φb(N) are at an H-level, the p-type switching transistors controlled by these signals are OFF. Specifically, the transistors M1, M6, M5, and M22 are OFF.

Since the signals S2(N), Φa(N), and SSS(N) are at an L-level, the p-type switching transistors controlled by these signals are ON. Specifically, the transistors M2, M4, M7, M9, M21, and M24 are ON. The transistor M23 is OFF.

During this period PR1, the sense line SL outputs a reference signal (Vrst×G). In the CDS circuit 320, the node between the capacitor Ca and the transistor M22 is at a voltage of Vc. This is because the transistor M21 is ON and the transistor M22 is OFF.

Figure 7:
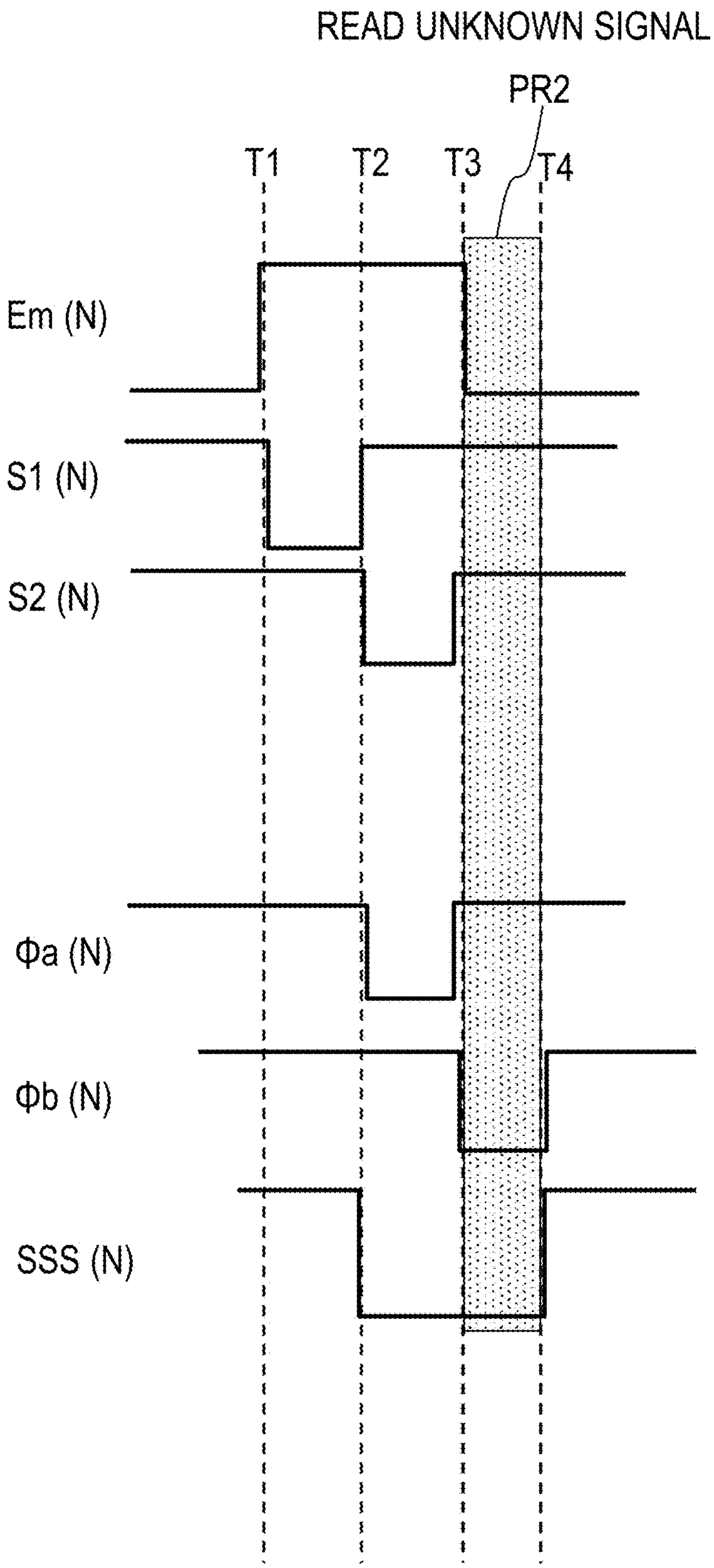
FIG. 7 is a timing chart illustrating temporal variation of some control signals in reading an unknown measurement target signal.

Next, reading an unknown measurement target signal is described. FIG. 7 is a timing chart illustrating temporal variation of some control signals in reading an unknown measurement target signal. Specifically, FIG. 7 illustrates temporal variation of the signals Em(N), S1(N), S2(N), Φa(N), Φb(N), and SSS(N). The temporal variation of these signals is identical to the one illustrated in FIG. 5.

The CDS circuit 320 reads the measurement target signal (Vf×G) during the period PR2 for 1H from the time T3 at which the period PR1 ends to a time T4. At the time T3, the signal Em(N) changes from the H-level to an L-level; the signal S1(N) keeps the H-level; the signal S2(N) changes from the L-level to an H-level; the signal Φa(N) changes from the L-level to an H-level; the signal Φb(N) changes from the H-level to an L-level; and the signal SSS(N) keeps the L-level.

Since the signal Em(N) changes to an L-level, the transistors M1 and M6 turn ON. Since the signal S1(N) keeps the H-level, the transistor M5 is kept OFF. Since the signal S2(N) changes to an H-level, the transistors M2, M4, and M7 turn OFF. This means that sense current in accordance with the voltage stored in the storage capacitor Cst flows within the pixel circuit.

Since the signal Φa(N) changes to an H-level, the transistors M21 and M24 turn OFF. Since the signal Φb(N) changes to an L-level, the transistor M22 turns ON. Since the signal SSS keeps the L-level, the transistor M9 is kept ON. One end of the capacitor Ca is supplied with a voltage (Vf×G) and the other end is electrically connected to the capacitor Cb.

Figure 8:
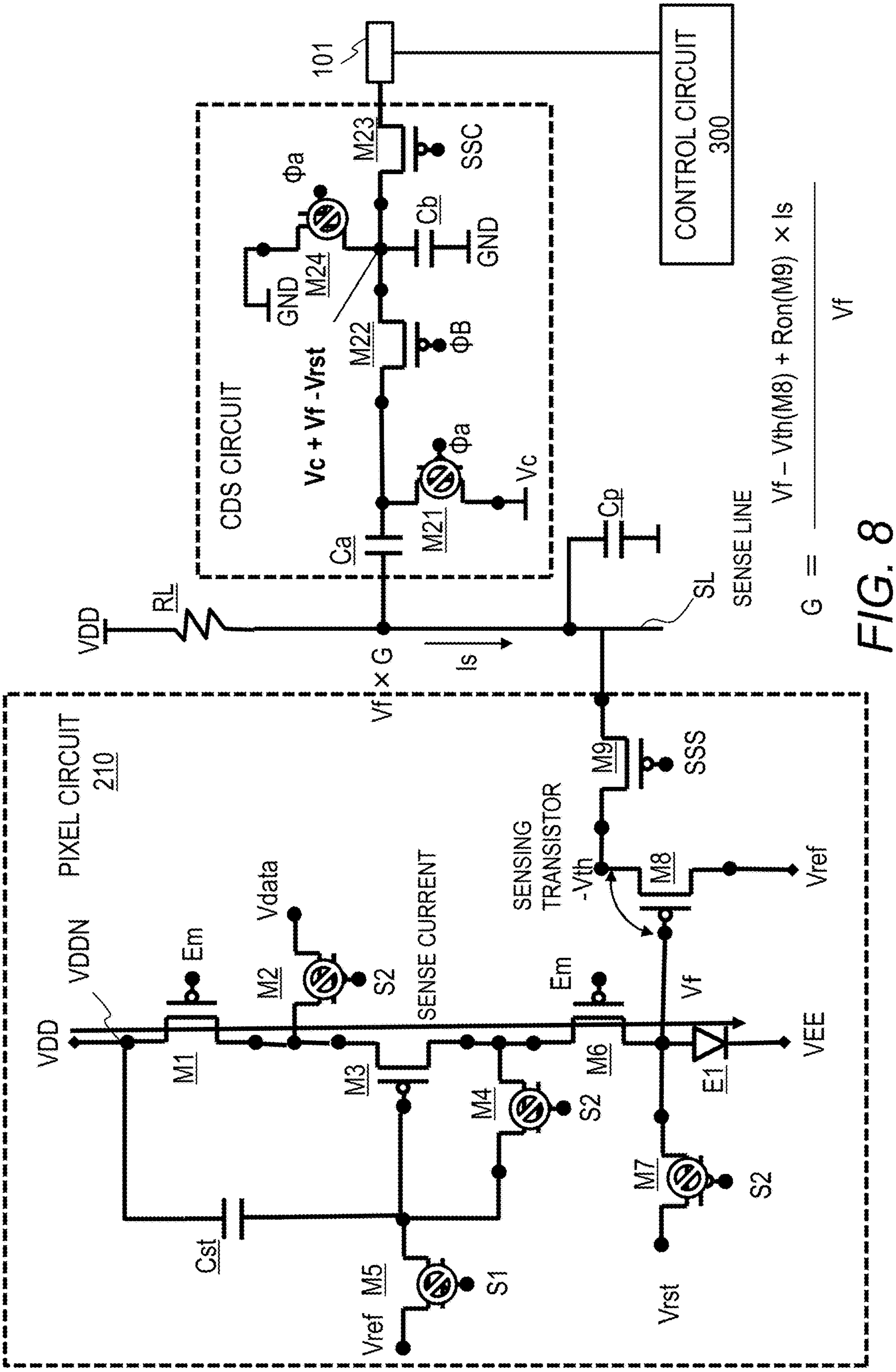
FIG. 8 illustrates the ON/OFF states of the transistors in a pixel circuit and a CDS circuit during a period PR2.

Accordingly, the signals S1(N), S2(N), and Φa(N) are at an H-level and the signals Em(N), Φb(N), and SSS(N) are at an L-level during the period PR2. FIG. 8 illustrates the ON/OFF states of the transistors in a pixel circuit 210 and a CDS circuit 320 during the period PR2. Since the signals S1(N), S2(N), and Φa(N) are at an H-level, the p-type switching transistors controlled by these signals are OFF. Specifically, the transistors M5, M2, M4, M7, M21, and M24 are OFF.

Since the signals Em(N), Φb(N), and SSS(N) are at an L-level, the p-type switching transistors controlled by these signals are ON. Specifically, the transistors M1, M6, M9, and M22 are ON. The transistor M23 is ON.

During this period PR2, the sense line SL outputs a measurement target signal (Vf×G). The presence of the capacitor Ca allows only the variation of the voltage (AC component) to be transmitted and therefore, the voltage in which the threshold voltage Vth of the transistor M8 is canceled is output to the capacitor Cb. Specifically, the voltage at the capacitor Cb is (Vc+(Vf×G)−(Vrst×G)=Vc+Vf−Vrst), where the voltages Vc and Vrst are known. This voltage (Vc+Vf−Vrst) is the definitive output voltage VOUT.

At the time T4, the signal Em(N) keeps the L-level; the signal S1(N) keeps the H-level; the signal S2(N) keeps the H-level; the signal Φa(N) keeps the H-level; the signal Φb(N) changes from the L-level to an H-level; and the signal SSS(N) changes from the L-level to an H-level.

The description of the control of the transistors in the pixel circuit 210 for measurement of deterioration of the OLED element E1 is applicable to the description of the regular control for image display. That is to say, in place of the data signal for determining the sense current, a data signal for displaying an image is written to the storage capacitor Cst. The reference signal for CDS is read in the reset period of the anode voltage of the OLED element E1 and the measurement target signal is read in a part of the subsequent emission period. As described above, controlling the switching transistors in a pixel circuit that are turned ON/OFF in regular image display (not including the transistor M9) with the identical timing in both displaying an image and measuring the deterioration of the OLED element achieves an efficient circuit and efficient control.

Figure 9:
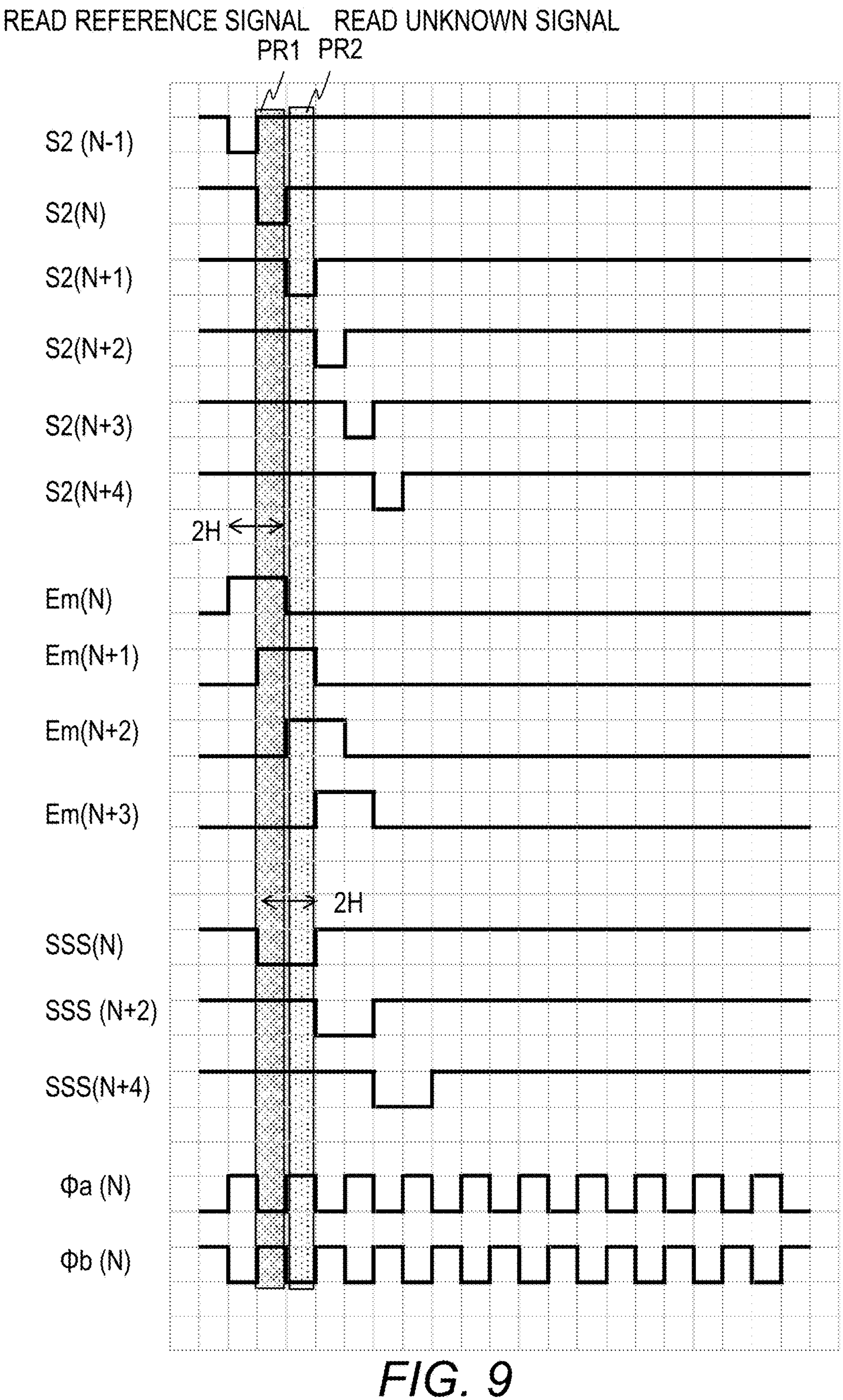
FIG. 9 illustrates temporal variation of signals S2, Em, SSS, Φa, and Φb.

The temporal variation of the control signals is described more. FIG. 9 illustrates temporal variation of the signals S2, Em, SSS, Φa, and Φb. The variables in parenthesis appended to each signal represent pixel circuit rows; (N) means that the signal is for the N-th pixel circuit row. Although FIG. 9 does not include the signal S1, the signal S1 varies in the same manner as the signal S2 but earlier than the signal S2 by 1H as described with reference to FIGS. 5 and 7. The periods PR1 and PR2 in FIG. 9 are the periods for measurement of the deterioration of an OLED element E1 in the N-th pixel circuit row.

FIG. 9 is a timing chart for controlling the 7T1C pixel circuit 210 and the CDS circuit 320 in FIG. 4 in the case where the signal Em has a pulse width (an H-level period) of 2H. The signals S1 and S2 have a pulse width (an L-level period) of 1H. The signal SSS has a pulse width (an L-level period) of 2H. The signals Φa and Φb have a pulse width of 1H. This timing enables the fastest measurement on the OLED element E1.

As described above, the reset voltage Vrst for the OLED element E1 is read as a reference voltage for calibrating the threshold voltage Vth of the transistor M8 in the sensing circuit 310. The signal (clamp signal) Φa for the CDS circuit 320 is synchronized with the signal S2 for resetting the anode of the OLED element E1.

Subsequently, the anode voltage Vf is read when the OLED element E1 is supplied with a predetermined sense current SC from the pixel circuit and starts emitting light. The signal (sampling signal) Φb for the CDS circuit 320 is synchronized with the signal S2 for the next pixel circuit row (N+1).

This driving method samples two voltages of the reset voltage Vrst and the anode voltage Vf and inputs them to the CDS circuit 320 while displaying a raster image with the reference current; as a result, a signal in which the variation in gain of the sensing circuit 310 is canceled is obtained.

The measurement of the voltage Vrst and the voltage Vf requires 1H for each, 2H in total for each pixel row. For this reason, the selection signal SSS has a pulse width of 2H. Therefore, the measurement has to be performed in every two rows. Namely, the measurement is carried out on odd-numbered rows in the first frame period and then the measurement is carried out on even-numbered rows in the second frame period to acquires data from all rows. Through this operation, measurement on one pixel circuit column is completed. This measurement is repeated for the number of times equal to the number of pixel circuit columns to complete measurement on all pixel circuits.

Here is provided an estimated acquisition time. Assuming that a full-HD display region is composed of 1920H×1080V, the output is multiplexed with RGB, and the measurement is performed at a frame frequency of 60 Hz, the time taken to measure all pixels can be calculated as follows:

Time taken to measure all pixels=2×16.7 ms×1920=64.1 s

This acquisition time is approximately 1/500 of the acquisition time required by using the existing method where the same magnitude of sense current is supplied from an external current supply.

Figure 10:
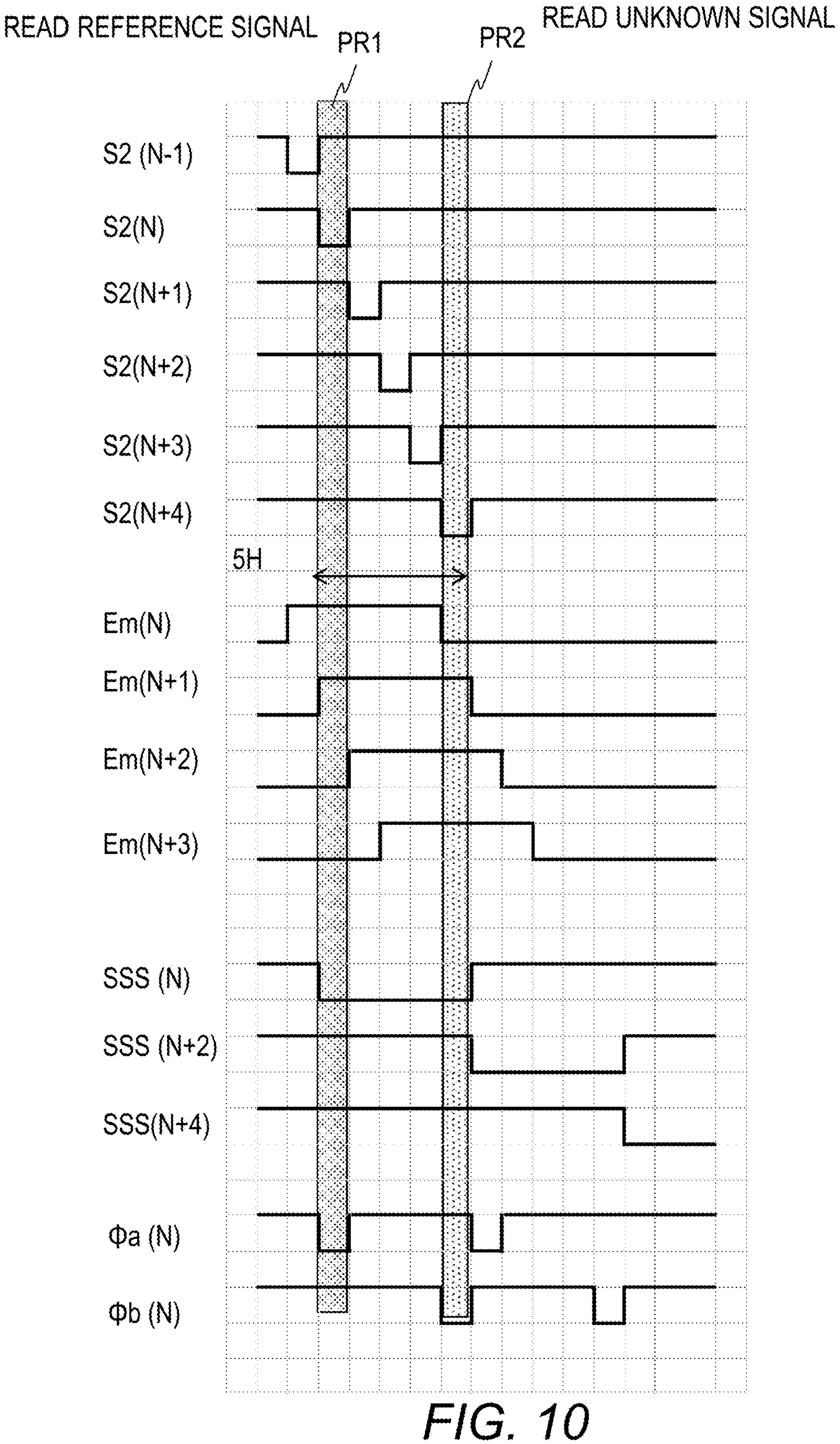
FIG. 10 is a timing chart for controlling the 7T1C pixel circuit and the CDS circuit in FIG. 4 in the case where the signal Em has a pulse width of 5H.

FIG. 10 is a timing chart for controlling the 7T1C pixel circuit 210 and the CDS circuit 320 in FIG. 4 in the case where the signal Em has a pulse width (an H-level period) of 5H. When the signal Em has a pulse width of 5H, a sense line SL is occupied for a time of 5H per pixel; the measurement on OLED elements is performed on every fifth row. The signals S1 and S2 have a pulse width (an L-level period) of 1H; the signal SSS has a pulse width (an L-level period) of 5H; and the signals Φa and Φb have a pulse width (an L-level period) of 1H. In this case, the data acquisition time required for all rows is 5 frame periods.

Assuming that a full-HD display region is composed of 1920H×1080V, the output is multiplexed with RGB, and the measurement is performed at a frame frequency of 60 Hz, the time taken to measure all pixels can be calculated as follows:

Time taken to measure all pixels=5×16.7 ms×1920=160.3 s

Although the time is longer than in the case where the pulse width is 2H, the method of this embodiment is applicable no matter how long the pulse width of the signal Em is.

Pixel Circuits in Other Embodiments

Figure 11:
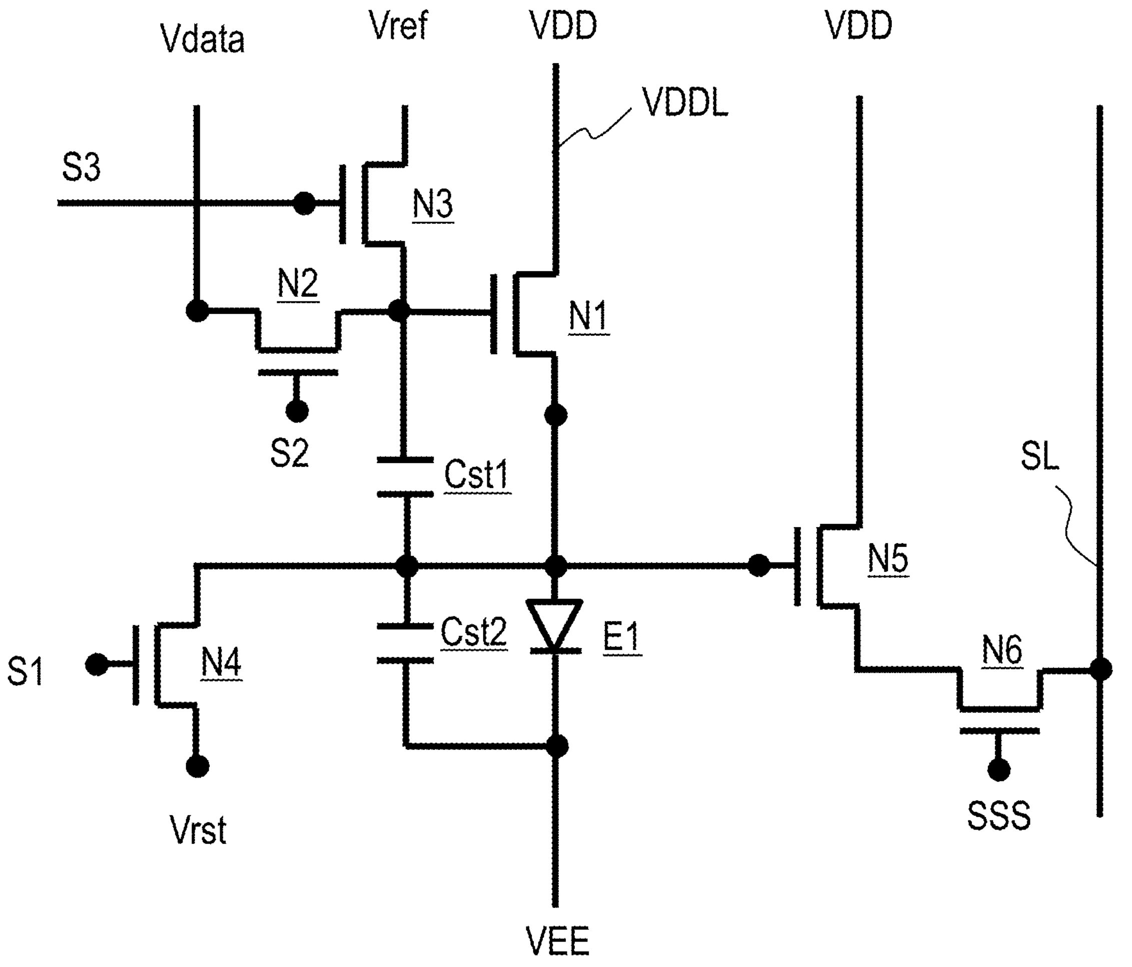
FIG. 11 illustrates an example of a pixel circuit to which the deterioration measurement for an OLED element in an embodiment of this specification is applicable.

FIG. 11 illustrates an example of a pixel circuit to which the deterioration measurement for an OLED element in an embodiment of this specification is applicable. The pixel circuit has a 4T2C configuration and all transistors therein are n-type thin-film transistors. The transistors in the CDS circuit are also n-type thin-film transistors. The relation among the constant voltages VDD, VEE, Vrst, and Vref is the same as that in the first embodiment, except that the polarities are inverted.

The transistor N1 is a driving transistor for controlling the amount of lighting current to the OLED element E1. Storage capacitors Cst1 and Cst2 are disposed in series between the gate of the transistor N1 and the cathode of the OLED element E1. The gate of the transistor N1 is connected to the drain of the transistor N3 and one source/drain of the transistor N2. The gate of the transistor N3 is controlled by a signal S3 and the reference voltage Vref is supplied to the gate of the transistor N1 via the transistor N3.

The gate of the transistor N2 is controlled by a signal S2 and a data signal Vdata is supplied to the gate of the transistor N1 or the storage capacitors Cst1 and Cst2 via the transistor N2.

The drain of the transistor N4 is connected to the anode of the OLED element E1 and its source is supplied with the reset voltage Vrst. The reset voltage Vrst is supplied to the anode of the OLED element E1 via the transistor N4. The gate of the transistor N4 is controlled by a signal S1.

The transistor N5 is a sensing transistor for measuring the anode voltage of the OLED element E1. The gate of the transistor N5 is connected to the anode of the OLED element E1 and its drain is supplied with the power supply voltage VDD. A sense line SL is connected to the source of the transistor N5 via the transistor N6. The gate of the transistor N6 is controlled by a signal SSS. The transistors N5 and N6 are included in a source follower circuit for measuring the anode voltage.

Figure 12:
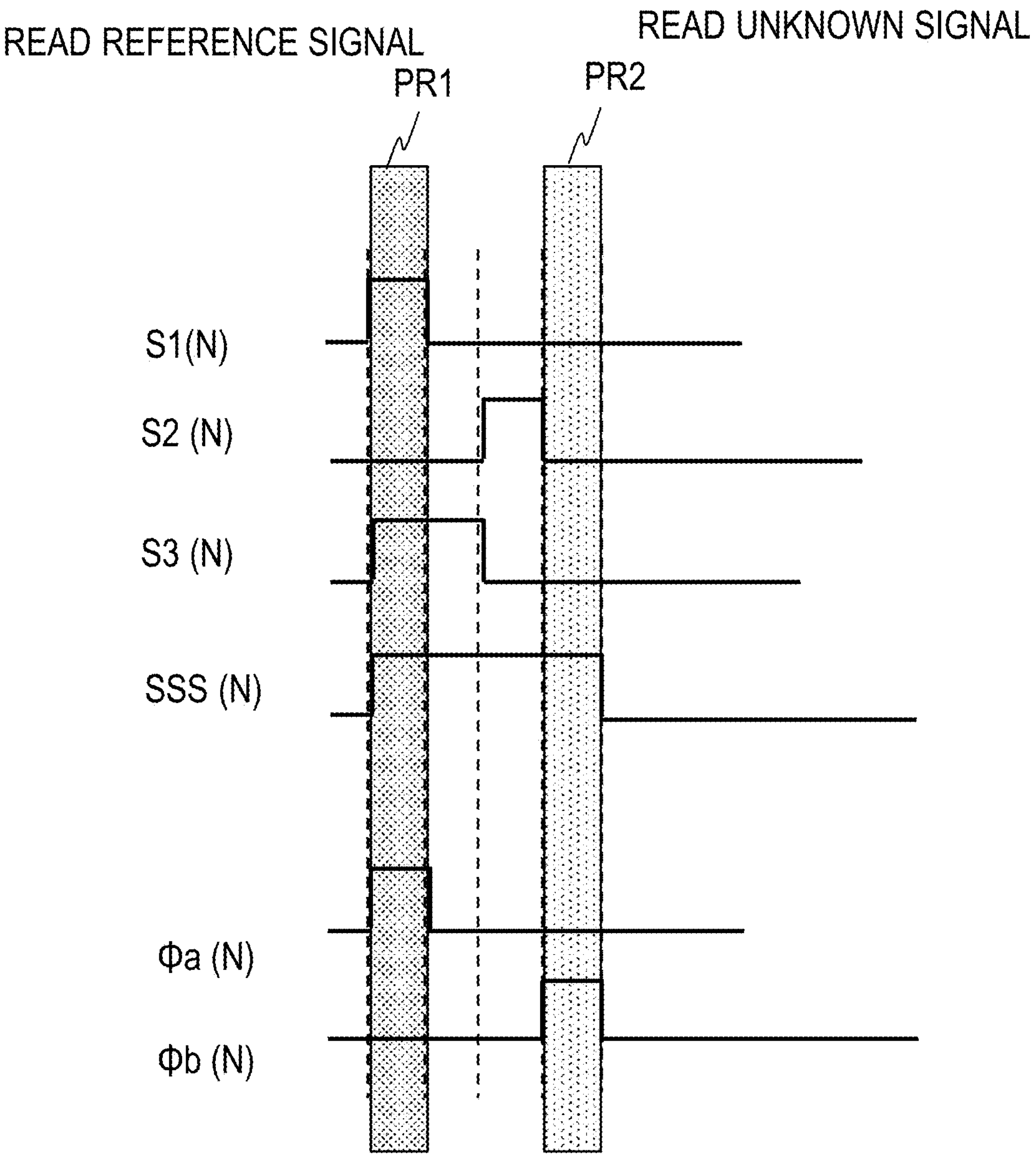
FIG. 12 is a timing chart of control signals for measuring the anode voltage in the pixel circuit in FIG. 11.

FIG. 12 is a timing chart of control signals for measuring the anode voltage in the pixel circuit in FIG. 11. Like the second embodiment, this example reads a reference signal (Vrst×G) for CDS during the period in which the reset voltage is being supplied to the anode of the OLED element E1 and reads the measurement target signal (Vf×G) when sense current is flowing through the OLED element E1. Reading the measurement target signal is included in an emission period in regular image display. Like the first embodiment, measurement without utilizing CDS is applicable to this pixel circuit.

With reference to FIG. 12, the CDS circuit reads a reference signal (Vrst×G) in the period PR1 for 1H. During the period PR1, the signals S1(N), S3(N), SSS(N), and Φa(N) are at an H-level. The signals S2(N) and Φb(N) are at an L-level. Since the signal S1(N) is at an H-level, the anode of the OLED element E1 is supplied with a reset voltage. Since the signal SSS(N) is at an H-level, the reference signal (Vrst×G) is read from the sense line SL.

The CDS circuit reads the unknown measurement target signal (Vf×G) in the period PR2 for 1H that is later than the period PR1 by 2H. During the period PR2, the signals S1(N), S2(N), S3(N), and Φa(N) are at an L-level and the signals SSS(N) and (Φb(N) are at an H-level. In this state, sense current flows from the power line VDDL into the OLED element E1 and the anode voltage of the OLED element E1 is Vf. The measurement target signal (Vf×G) is read from the sense line SL.

The temporal variation of the signals S1(N), S2(N), and S3(N) described with reference to FIG. 12 is the same as the one in regular image display. Instead of a data signal for determining the sense current, a data signal for determining the light intensity is written to the storage capacitors Cst1 and Cst2 to display an image. If the pixel circuit control for image display includes a reset period for the anode of the OLED element like this example, efficient measurement on the OLED element is available. The constant voltage for the reference signal can be a voltage different from the reset voltage Vrst. Like in the first embodiment, the measurement can use a method different from CDS.

Figure 13:
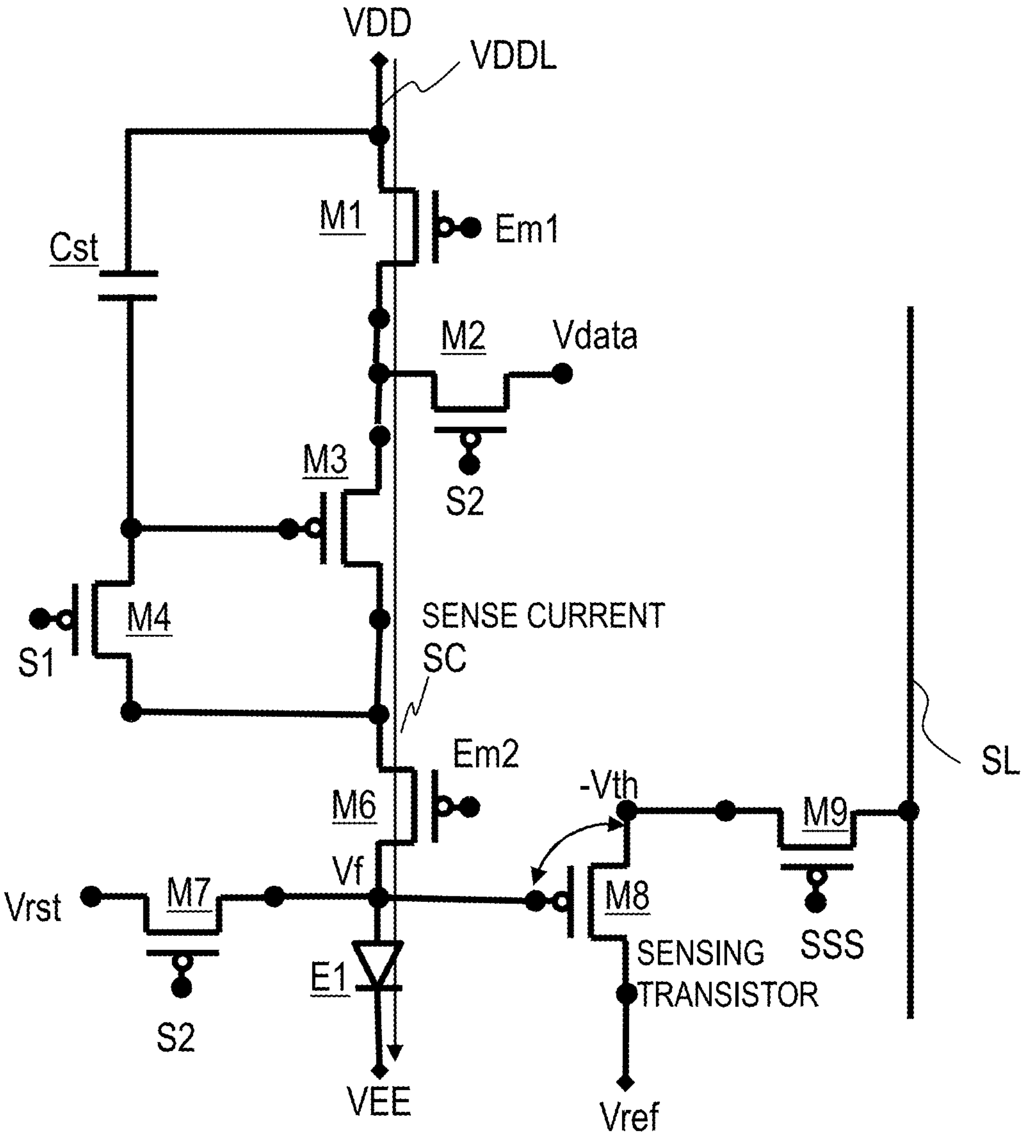
FIG. 13 illustrates another example of a pixel circuit to which the deterioration measurement for an OLED element in an embodiment of this specification is applicable.

FIG. 13 illustrates another example of a pixel circuit to which the deterioration measurement for an OLED element in an embodiment of this specification is applicable. The pixel circuit has a 6T1C configuration and all transistors therein are p-type thin-film transistors. The relation among the constant voltages VDD, VEE, Vrst, and Vref is the same as that in the first embodiment. The pixel circuit in FIG. 13 has a configuration such that the transistor M5 is excluded from the pixel circuit in FIG. 2.

The signals for controlling the pixel circuit in FIG. 13 are different from the control signals for the pixel circuit in FIG. 2. Specifically, the gate of the transistor M1 is controlled by a signal Em1 and the gate of the transistor M6 is controlled by a signal Em2. The gate of the transistor M4 is controlled by a signal S1 and the gates of the transistors M2 and M7 are controlled by a signal S2.

Figure 14:
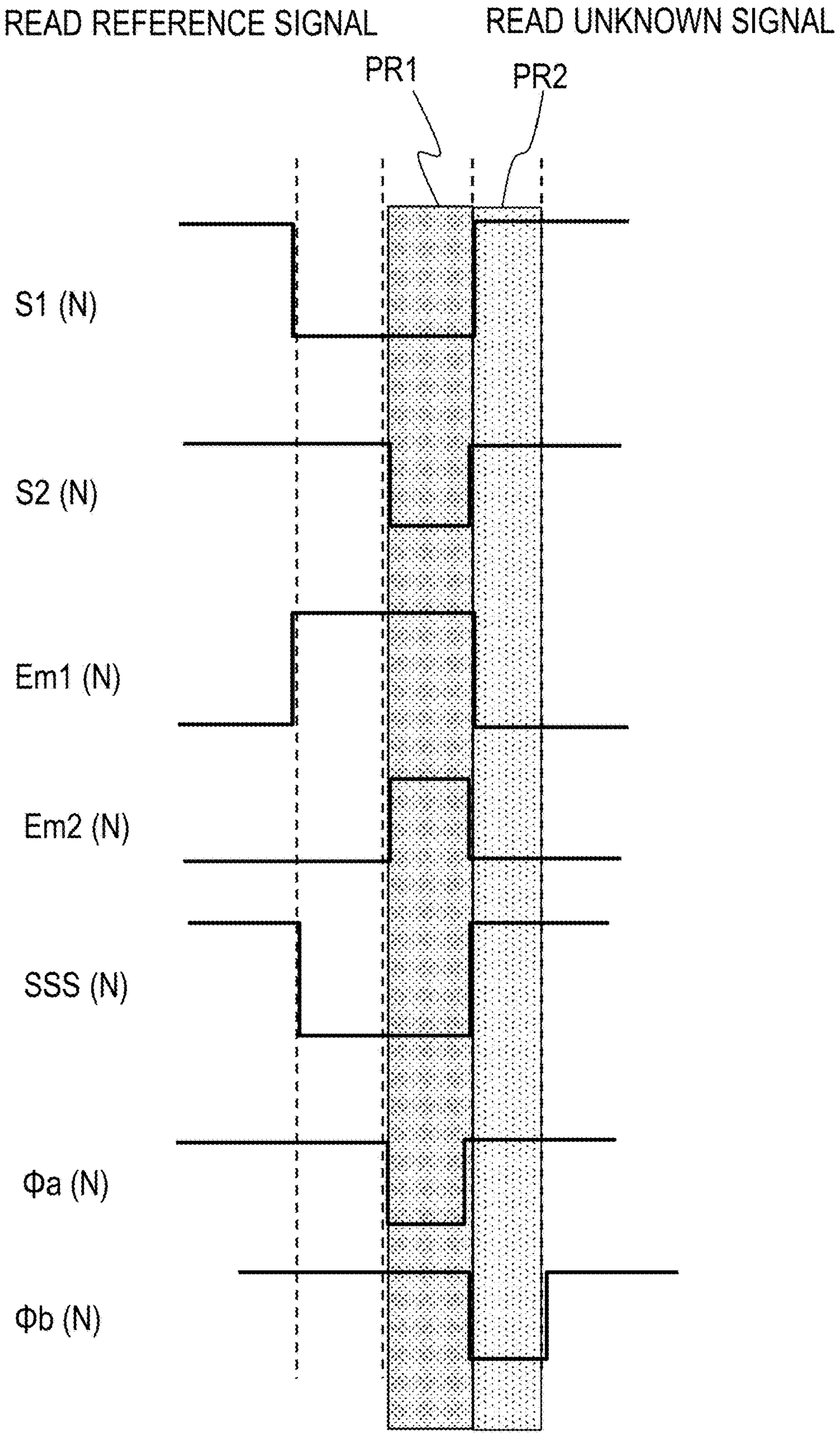
FIG. 14 is a timing chart of control signals for measuring the anode voltage in the pixel circuit in FIG. 13.

FIG. 14 is a timing chart of control signals for measuring the anode voltage in the pixel circuit in FIG. 13. Like the second embodiment, this example reads a reference signal (Vrst×G) for CDS during the period in which the reset voltage is being supplied to the anode of the OLED element E1 and reads the measurement target signal (Vf×G) when sense current is flowing through the OLED element E1. Reading the measurement target signal is included in an emission period in regular image display. Like the first embodiment, measurement without utilizing CDS is applicable to this pixel circuit.

The signal S1(N) has a pulse width (an L-level period) of 2H and the signal S2(N) has a pulse width (an L-level period) of 1H. The signal Em1 has a pulse width (an H-level period) of 2H and the signal Em2 has a pulse width (an H-level period) of 1H. The signal SSS(N) has a pulse width (an L-level period) of 2H and the signals Φa(N) and Φb(N) have a pulse width (an L-level period) of 1H.

With reference to FIG. 14, the CDS circuit 320 reads a reference signal (Vrst×G) in the period PR1 for 1H. During the period PR1, the signals S1(N), S2(N), SSS(N), and Φa(N) are at an L-level. The signals Em1(N), Em2(N) and Φb(N) are at an H-level. Since the signal S2(N) is at an H-level, the transistor M7 is ON and the anode of the OLED element E1 is supplied with a reset voltage. Since the signals Em1(N) and Em2(N) are at an H-level, the transistors M1 and M6 are OFF and the sense current does not flow. The reference signal (Vrst×G) is read from the sense line SL.

The CDS circuit 320 reads the unknown measurement target signal (Vf×G) in the period PR2 for 1H immediately after the period PR1. During the period PR2, the signals S1(N), S2(N), SSS(N), and Φa(N) are at an H-level and the signals Em1(N), Em2(N), and Φb(N) are at an L-level. In this state, sense current flows from the power line VDDL into the OLED element E1 and the anode voltage of the OLED element E1 is Vf. The measurement target signal (Vf×G) is read from the sense line SL.

The temporal variation of the signals S1(N), S2(N), Em1(N), and Em2(N) described with reference to FIG. 14 is the same as the one in regular image display. Instead of a data signal for determining the sense current, a data signal for determining the light intensity is written to the storage capacitor Cst to display an image. If the pixel circuit control for image display includes a reset period for the anode of the OLED element like this example, efficient measurement on the OLED element is available. The constant voltage for the reference signal can be a voltage different from the reset voltage Vrst. Like in the first embodiment, the measurement can use a method different from CDS.

Circuit Layouts in Other Embodiments

Figure 15:
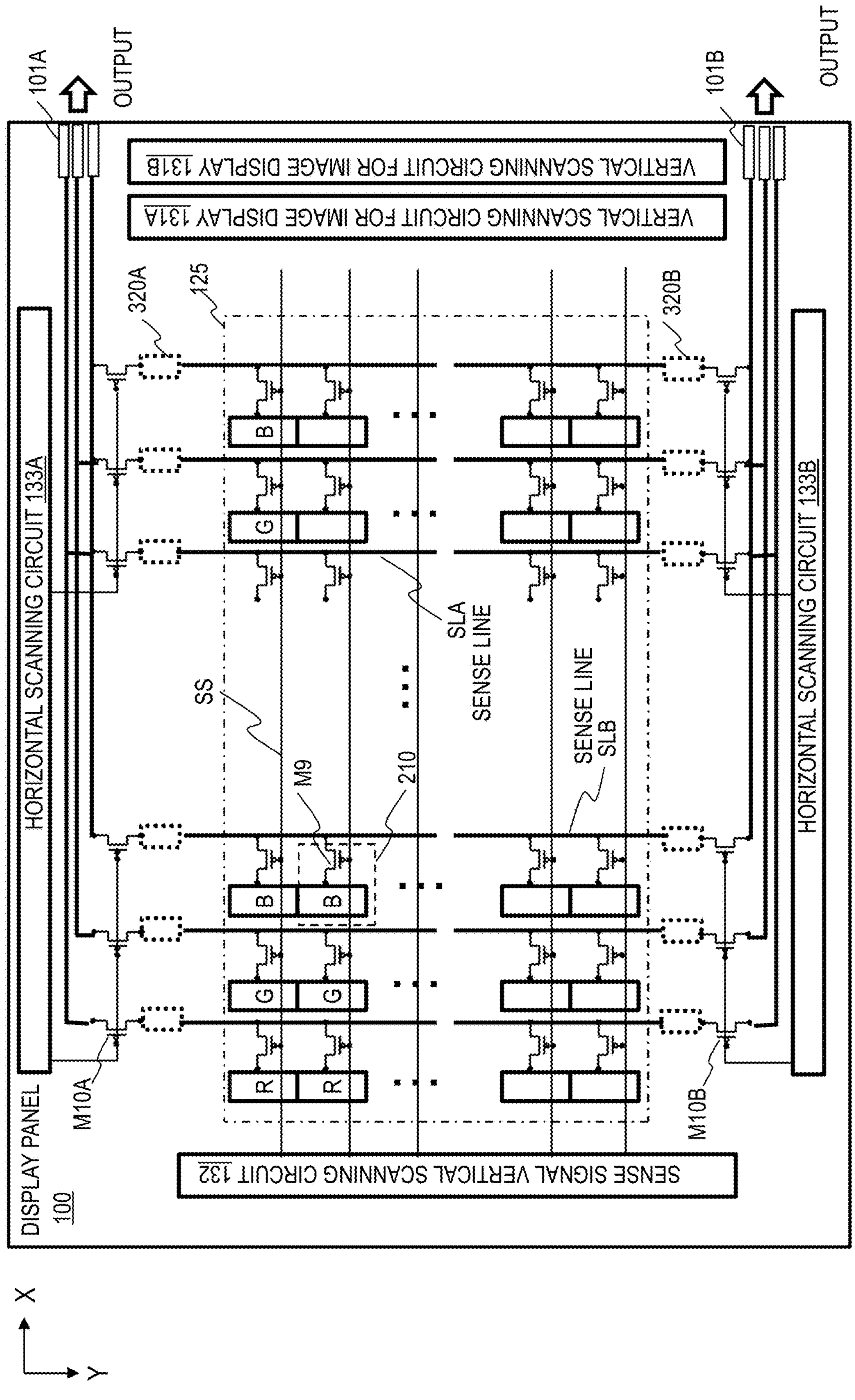
FIG. 15 illustrates a configuration example where sense lines are divided for the upper region and the lower region of the display panel to reduce the sense line capacitance.

Hereinafter, some circuit layouts of a display panel 100 are described. FIG. 15 illustrates a configuration example where sense lines are divided for the upper region and the lower region of the display panel 100 to reduce the sense line capacitance. Reducing the capacitance of a sense line can reduce the time taken to read a signal through the sense line.

In the configuration example in FIG. 15, the pixel circuits in each pixel circuit column are separated into two pixel circuit groups and each pixel circuit group is composed of consecutive pixel circuits. In an example, each pixel circuit group includes the same number of pixel circuits. The number of pixel circuits can be different. In FIG. 15, each pixel circuit column is separated into an upper pixel circuit group and a lower pixel circuit group. Each pixel circuit column can be separated into three or more pixel circuit groups. The pixel circuits 210 in an upper pixel circuit group are connected to a sense line SLA. The pixel circuits 210 in a lower pixel circuit group are connected to a sense line SLB. The sense lines SLA and SLB are separate. In FIG. 15, one of the upper sense lines is provided with a reference sign SLA and one of the lower sense lines is provided with a reference sign SLB by way of example. The sense lines SLA and SLB are shorter than a pixel circuit column, substantially equal to a half of a pixel circuit column.

Each sense line SLA is connected to a CDS circuit 320A disposed on the upper side of the display region 125. A plurality of CDS circuits 320A are provided for individual sense lines SLA. A switching transistor M10A is disposed between a CDS circuit 320A and an output terminal 101A. In FIG. 15, one of the upper CDS circuits is provided with a reference sign 320A and one of the upper transistors is provided with a reference sign M10A by way of example.

The CDS circuits 320A for the pixel circuits for the same color are connected to the same output terminal 101A and the CDS circuit 320A to be electrically connected to the output terminal 101A is changed by the switching transistors M10A. The switching transistors M10A are controlled to be ON/OFF by the horizontal scanning circuit 133A disposed on the upper side of the display region 125.

Each sense line SLB is connected to a CDS circuit 320B disposed on the lower side of the display region 125. A plurality of CDS circuits 320B are provided for individual sense lines SLB. A switching transistor M10B is disposed between a CDS circuit 320B and an output terminal 101B. In FIG. 15, one of the lower CDS circuits is provided with a reference sign 320B and one of the lower transistors is provided with a reference sign M10B by way of example.

The CDS circuits 320B for the pixel circuits for the same color are connected to the same output terminal 101B and the CDS circuit 320B to be electrically connected to the output terminal 101B is changed by the switching transistors M10B. The switching transistors M10B are controlled to be ON/OFF by the horizontal scanning circuit 133B disposed on the lower side of the display region 125. The data line driving circuit 134 is omitted in FIG. 15.

Figure 16:
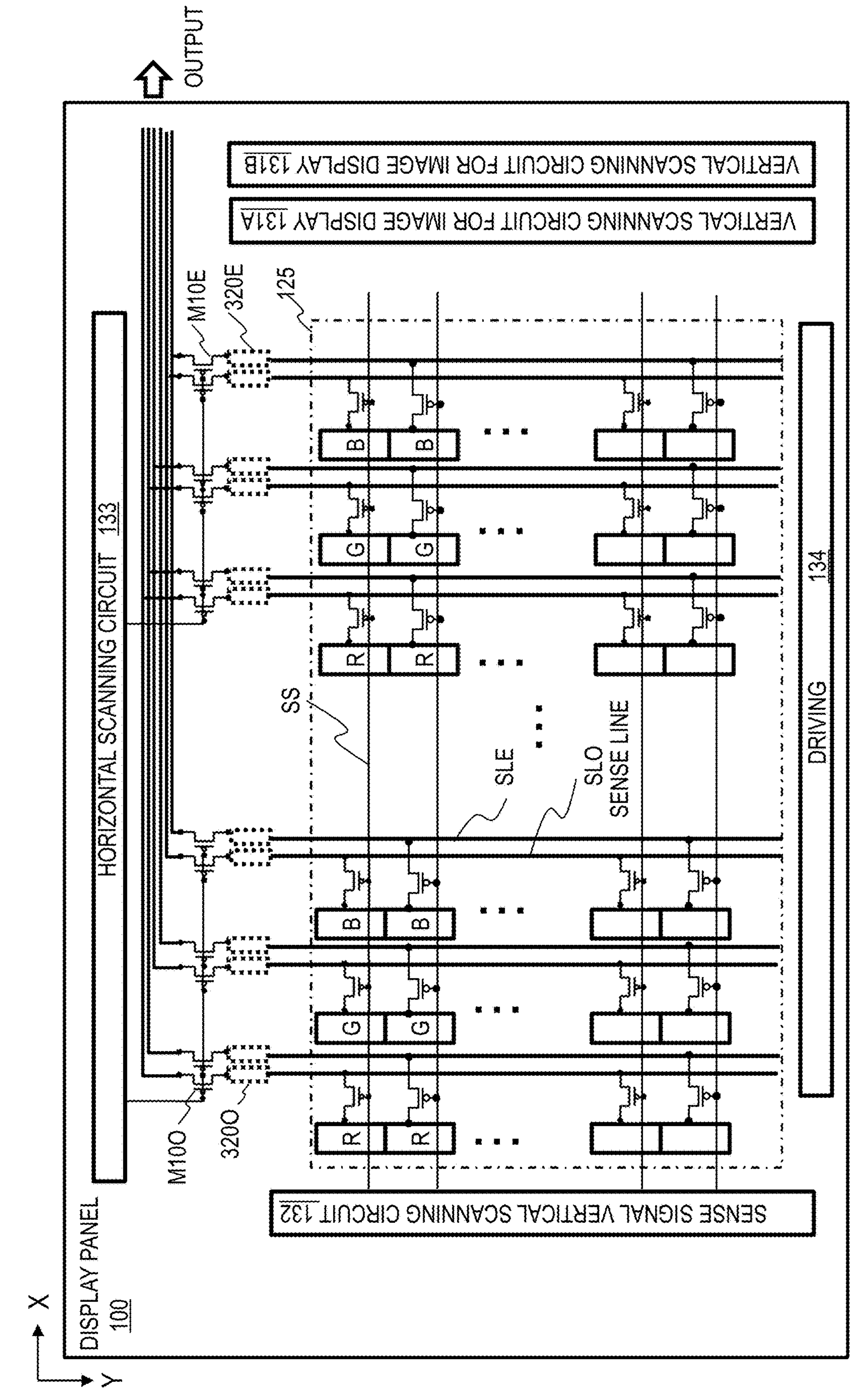
FIG. 16 illustrates a configuration example where each pixel circuit column is divided into a pixel circuit group consisting of the odd-numbered pixel circuits and another pixel circuit group consisting of the even-numbered pixel circuits and each pixel circuit group is connected to a different sense line.

The configuration example illustrated in FIG. 16 is such that each pixel circuit column is divided into two pixel circuit groups and each pixel circuit group is connected to a different sense line. Specifically, each pixel circuit column is separated into a pixel circuit group consisting of the odd-numbered pixel circuits and a pixel circuit group consisting of the even-numbered pixel circuits. Reducing the number of pixel circuits connected to one sense line reduces the capacitance of the path of a sense signal, reducing the time taken to read the signal. Each pixel circuit column can be separated into three or more pixel circuit groups.

As illustrated in FIG. 16, each pixel circuit column is provided with sense lines SLO and SLE. One each of those sense lines are provided with a reference sign SLO or SLE by way of example. A sense line SLO is connected to the odd-numbered pixel circuits in the associated pixel circuit column and a sense line SLE is connected to the even-numbered pixel circuits in the associated pixel circuit column.

Each sense line SLO is connected to a CDS circuit 320O. The CDS circuit 320O processes the reference signal and the measurement target signal transmitted by the sense line SLO. The output of the CDS circuit 320O is connected to a switching transistor M10O. Each sense line SLO is provided with a CDS circuit 320O and a switching transistor M10O.

Each sense line SLE is connected to a CDS circuit 320E. The CDS circuit 320E processes the reference signal and the measurement target signal transmitted by the sense line SLE. The output of the CDS circuit 320E is connected to a switching transistor M10E. Each sense line SLE is provided with a CDS circuit 320E and a switching transistor M10E.

The signals on the sense lines SLO for the pixel circuits for the same color are output from the same output terminal (not shown) via the CDS circuits 320O and the switching transistors M10O. One CDS circuit 320O is selected by a switching transistor M10O to output a signal therefrom. The signals on the sense lines SLE for the pixel circuits for the same color are output from the same output terminal (not shown) via the CDS circuits 320E and the switching transistors M10E. One CDS circuit 320E is selected by a switching transistor M10E to output a signal therefrom.

Figure 17:
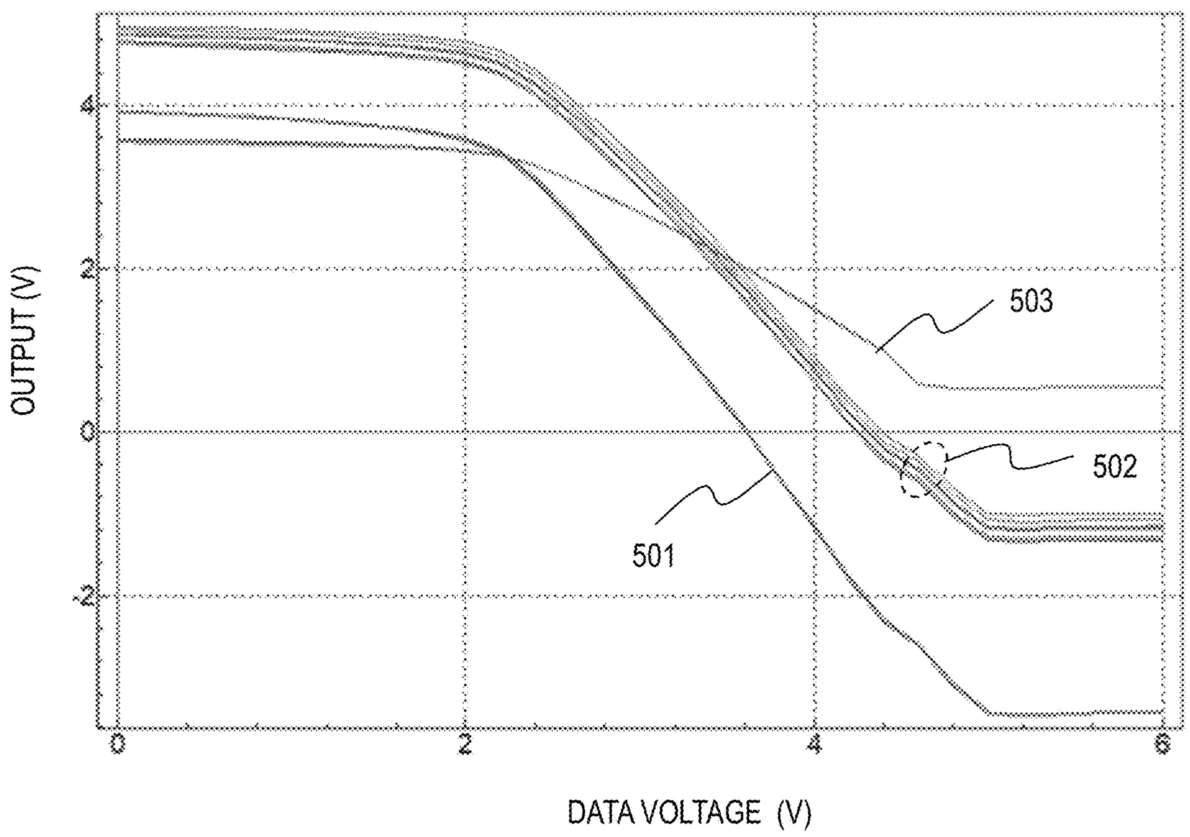
FIG. 17 provides a simulation result calculated by the Monte Carlo method about the variation of the voltage of a sense line and the output of a CDS circuit in response to data signal voltage in the cases where the sensing transistor has different threshold voltages Vth.

FIG. 17 provides a simulation result calculated by the Monte Carlo method about the variation of the voltage of a sense line and the output of a CDS circuit in response to data signal voltage in the cases where the sensing transistor has different threshold voltages Vth.

In the graph of FIG. 17, the horizontal axis represents data signal voltage corresponding to the amount of sense current and the vertical axis represents voltage. The curve 501 represents the anode voltage Vf of an OLED element. The curves 502 represent voltage of a sense line in the cases where the sensing transistor has different threshold voltages Vth. The curve 503 represents the output voltage in the cases where the sensing transistor has different threshold voltages Vth. As indicated in FIG. 17, the variations in threshold voltage Vth are effectively canceled in the output of the CDS circuit.

As set forth above, embodiments of this disclosure have been described, however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device comprising:

a plurality of pixel circuits arranged in a display region on a substrate;

a sense line on the substrate; and a measurement circuit, wherein each of the plurality of pixel circuits includes:

a light-emitting element;

a first power line configured to supply the light-emitting element with a power-supply voltage that makes electric current flow through the light-emitting element;

a driving transistor configured to control an amount of lighting current to the light-emitting element; and a sensing circuit, wherein the sensing circuit includes:

a sensing transistor whose gate electrode is connected to an end of the light-emitting element;

a second power line connected to a drain electrode of the sensing transistor; and a first switching transistor connected between a source electrode of the sensing transistor and the sense line, the first switching transistor turned ON/OFF by a scanning signal for sensing, wherein the driving transistor is configured to control sense current from the first power line to the light-emitting element in order to measure a voltage at an end of the light-emitting element, wherein the sensing transistor is configured to supply a source voltage to the sense line through the first switching transistor when the light-emitting element is being supplied with the sense current, and wherein the measurement circuit is configured to determine a voltage of the light-emitting element based on an output of the sense line.

2. The display device according to claim 1, wherein the measurement circuit is configured to:

hold information on input/output gain of the sensing circuit; and calibrate an output of the sense line based on the information on the input/output gain.

3. The display device according to claim 1, further comprising:

a correlated double sampling circuit, wherein the correlated double sampling circuit is configured to:

receive a reference signal through the sense line when an end of the light-emitting element is being supplied with a reference voltage;

receive an unknown signal through the sense line when the light-emitting element is being supplied with the sense current; and output a difference signal between the reference signal and the unknown signal, and wherein the measurement circuit is configured to determine a voltage of the light-emitting element based on the output from the correlated double sampling circuit.

4. The display device according to claim 3, wherein the correlated double sampling circuit is mounted on the substrate.

5. The display device according to claim 3, wherein each of the plurality of pixel circuits includes a second switching transistor configured to supply a reset voltage to an end of the light-emitting element prior to displaying an image, and wherein the reset voltage is used as the reference voltage.

6. The display device according to claim 1, wherein the display device comprises a plurality of sense lines including the sense line on the substrate, wherein the plurality of pixel circuits are arrayed to form a plurality of pixel circuit columns, wherein each of the plurality of pixel circuit columns is divided into two pixel circuit groups, wherein each of the two pixel circuit groups is composed of consecutive pixel circuits, and wherein the two pixel circuit groups are connected to different sense lines.

7. The display device according to claim 1, wherein the display device includes a plurality of sense lines including the sense line on the substrate, wherein the plurality of pixel circuits are arrayed to form a plurality of pixel circuit columns, wherein each of the plurality of pixel circuit columns is divided into two pixel circuit groups, wherein one of the two pixel circuit groups is composed of odd-numbered pixel circuits and the other one of the two pixel circuit groups is composed of even-numbered pixel circuits, and wherein the two pixel circuit groups are connected to different sense lines.

8. A display device comprising:

a plurality of pixel circuits on a substrate;

a sense line on the substrate;

a correlated double sampling circuit; and a measurement circuit, wherein each of the plurality of pixel circuits includes:

a light-emitting element;

a first power line configured to supply the light-emitting element with a power-supply voltage that makes electric current flow through the light-emitting element;

a driving transistor configured to control an amount of lighting current to the light-emitting element;

a sensing transistor whose gate electrode is connected to an end of the light-emitting element;

a second power line connected to a drain electrode of the sensing transistor; and a first switching transistor connected between a source electrode of the sensing transistor and the sense line, wherein the sensing transistor, the first switching transistor, the sense line, and the second power line are included in a sensing circuit, wherein the driving transistor is configured to control sense current from the first power line to the light-emitting element in order to measure a voltage at an end of the light-emitting element, wherein the sensing transistor is configured to supply a source voltage to the sense line when the light-emitting element is being supplied with the sense current, wherein the measurement circuit is configured to determine a voltage of the light-emitting element based on an output of the sense line, wherein the correlated double sampling circuit is configured to:

receive a reference signal through the sense line when an end of the light-emitting element is being supplied with a reference voltage;

receive an unknown signal through the sense line when the light-emitting element is being supplied with the sense current; and output a difference signal between the reference signal and the unknown signal, and wherein the measurement circuit is configured to determine a voltage of the light-emitting element based on the output from the correlated double sampling circuit.

9. The display device according to claim 8, wherein the correlated double sampling circuit is mounted on the substrate.

10. The display device according to claim 8, wherein each of the plurality of pixel circuits includes a second switching transistor configured to supply a reset voltage to an end of the light-emitting element prior to displaying an image, and wherein the reset voltage is used as the reference voltage.

* * * * *